United States Patent
Cho et al.

(10) Patent No.: US 10,069,984 B2
(45) Date of Patent: Sep. 4, 2018

(54) MOBILE DEVICE AND METHOD FOR CONTROLLING THE SAME

(71) Applicant: LG ELECTRONICS INC., Seoul (KR)

(72) Inventors: Eunhyung Cho, Seoul (KR); Sinae Chun, Seoul (KR); Jihwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/801,651

(22) Filed: Nov. 2, 2017

(65) Prior Publication Data

US 2018/0063344 A1 Mar. 1, 2018

Related U.S. Application Data

(63) Continuation of application No. 14/778,493, filed as application No. PCT/KR2014/001340 on Feb. 19, (Continued)

(30) Foreign Application Priority Data

| May 20, 2013 | (KR) | 10-2013-0056758 |
| Jun. 21, 2013 | (WO) | PCT/KR2013/005493 |
| Jan. 21, 2014 | (KR) | 10-2014-0007190 |

(51) Int. Cl.
*H04N 5/232* (2006.01)
*G03B 13/00* (2006.01)
(Continued)

(52) U.S. Cl.
CPC ....... *H04N 1/00334* (2013.01); *G06K 9/2063* (2013.01); *G06Q 20/3276* (2013.01);
(Continued)

(58) Field of Classification Search
CPC .................................................. H04N 5/23219
(Continued)

(56) References Cited

U.S. PATENT DOCUMENTS

| 6,222,583 B1 | 4/2001 | Matsumura et al. |
| 2004/0125224 A1 | 7/2004 | Reiffel |

(Continued)

FOREIGN PATENT DOCUMENTS

| CN | 1822693 A | 8/2006 |
| CN | 102855079 A | 1/2013 |

(Continued)

OTHER PUBLICATIONS

Jung et al., "An Efficient Car Management System based on an Object-Oriented Modeling using Car Number Recognition and Smart Phone," Korea Electronics Theological Institute Journal, Jul. 20, 2012, 12 pages.

*Primary Examiner* — Anthony J Daniels
(74) *Attorney, Agent, or Firm* — Birch, Stewart, Kolasch & Birch, LLP

(57) ABSTRACT

A mobile device includes a camera unit configured to sense an image; a display unit configured to display the image; a sensor unit configured to detect an input signal and transmit the detected input signal to a processor; a storage unit; and the processor configured to control the display unit, the camera unit, the sensor unit, wherein the processor is further configured to: provide an image capturing interface displaying the image sensed by the camera unit, display a pattern code indicator when a pattern code is recognized from the image, store the image in the storage unit in response to a first input signal, and store data linked to the pattern code in the storage unit in response to a second input signal.

14 Claims, 19 Drawing Sheets

Related U.S. Application Data 2014, now Pat. No. 9,813,567, which is a continuation of application No. 14/176,851, filed on Feb. 10, 2014, now Pat. No. 8,866,953, which is a continuation-in-part of application No. 13/922,873, filed on Jun. 20, 2013, now Pat. No. 8,704,939.

(60) Provisional application No. 61/803,757, filed on Mar. 20, 2013.

(51) Int. Cl.
*H04N 1/00* (2006.01)
*H04N 1/21* (2006.01)
*G06Q 20/32* (2012.01)
*H04M 1/725* (2006.01)
*H04N 1/32* (2006.01)
*G06K 9/20* (2006.01)

(52) U.S. Cl.
CPC ...... *H04M 1/72522* (2013.01); *H04N 1/2125* (2013.01); *H04N 1/32144* (2013.01); *H04N 5/232* (2013.01); *H04N 5/23203* (2013.01); *H04N 5/23212* (2013.01); *H04N 5/23216* (2013.01); *H04N 5/23219* (2013.01); *H04N 5/23293* (2013.01); *H04M 2250/52* (2013.01); *H04N 2201/0084* (2013.01); *H04N 2201/3242* (2013.01); *H04N 2201/3249* (2013.01); *H04N 2201/3269* (2013.01)

(58) Field of Classification Search
USPC .......................................... 348/333.02, 345
See application file for complete search history.

(56) References Cited

U.S. PATENT DOCUMENTS

| | | |
|---|---|---|
| 2008/0123973 A1 | 5/2008 | Cho et al. |
| 2009/0303036 A1 | 12/2009 | Sahuguet |
| 2011/0267172 A1 | 11/2011 | Riechel |
| 2012/0208592 A1 | 8/2012 | Davis et al. |
| 2012/0217292 A1 | 8/2012 | Gratton et al. |
| 2012/0282905 A1 | 11/2012 | Owen |
| 2012/0284012 A1 | 11/2012 | Rodriguez et al. |

FOREIGN PATENT DOCUMENTS

| | | |
|---|---|---|
| CN | 103038781 A | 4/2013 |
| EP | 2535842 A1 | 12/2012 |
| JP | 2012-208796 A | 10/2012 |
| KR | 10-2011-0010666 A | 2/2011 |
| KR | 10-2011-0048754 A | 5/2011 |
| KR | 10-2012-0130657 A | 12/2012 |
| KR | 10-2013-0006878 A | 1/2013 |

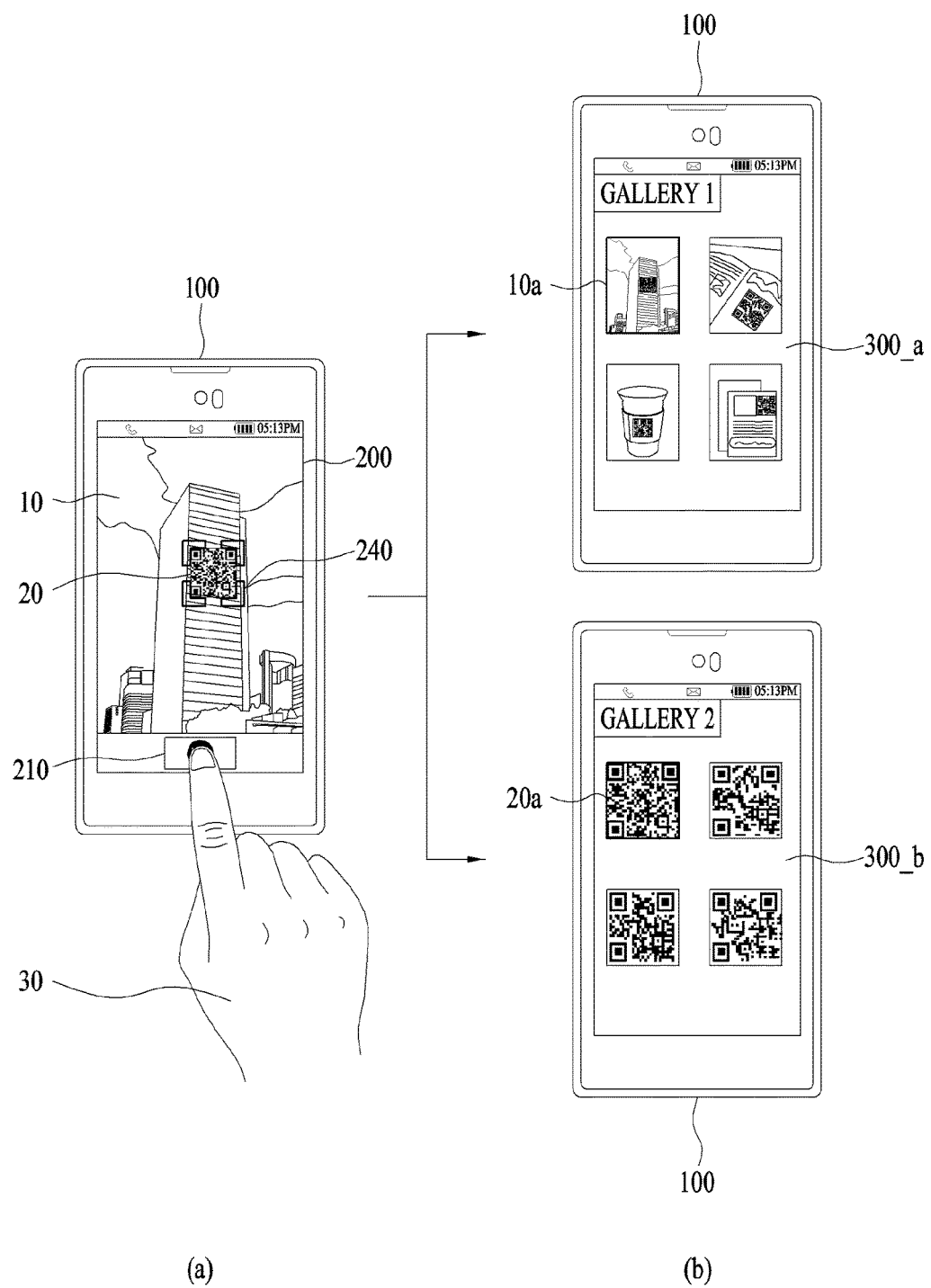

(a)  (b)

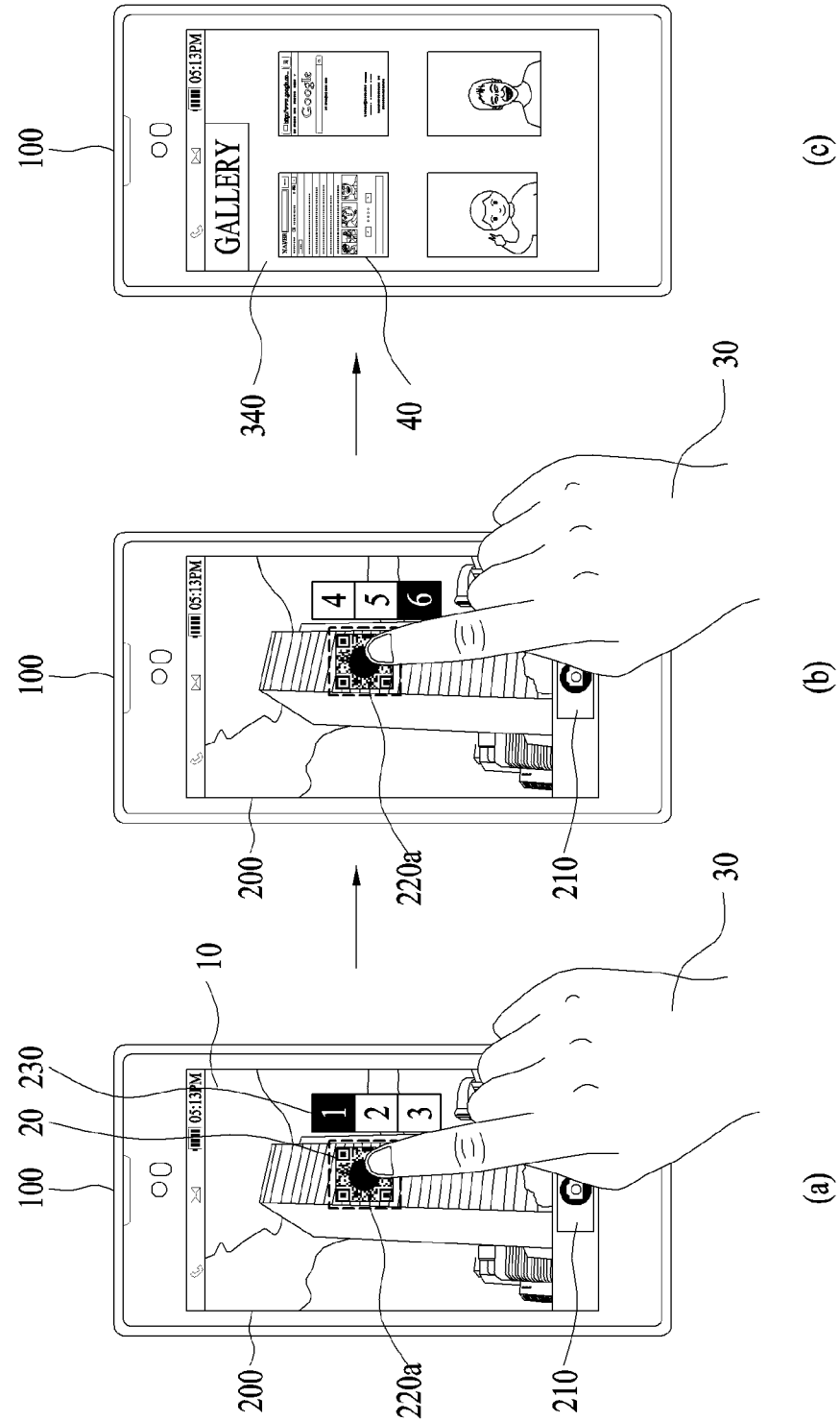

(a)

(b)

(a)  (b)

(a)  (b)

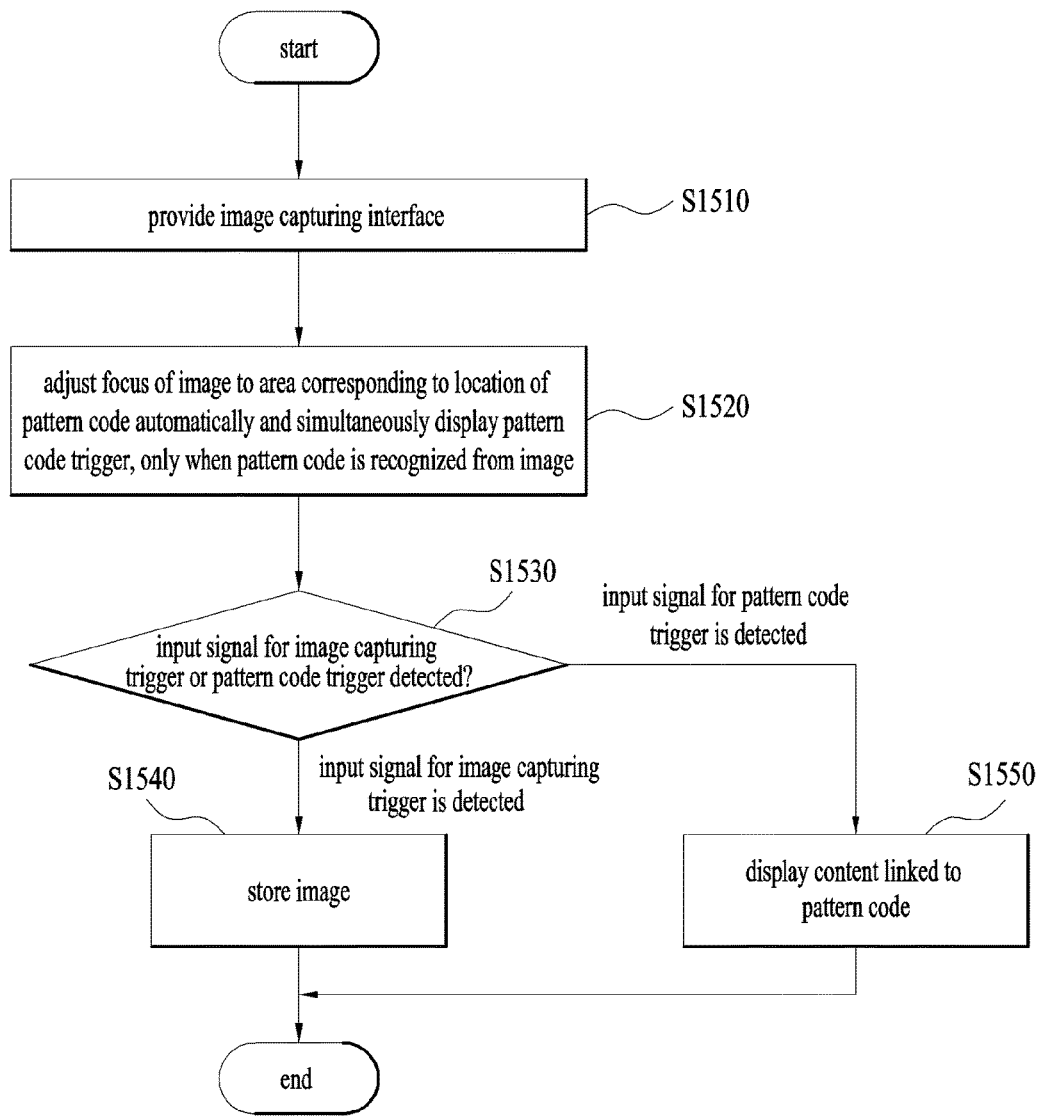

MOBILE DEVICE AND METHOD FOR CONTROLLING THE SAME

CROSS-REFERENCE TO RELATED APPLICATIONS

This Application is a Continuation of U.S. patent application Ser. No. 14/778,493 filed on Sep. 18, 2015, which is the National Phase of PCT International Application No. PCT/KR2014/001340 filed on Feb. 19, 2014, which is a Continuation of U.S. patent application Ser. No. 14/176,851 filed on Feb. 10, 2014 (now U.S. Pat. No. 8,866,953 issued on Oct. 21, 2014), which is a Continuation-in-part of U.S. patent application Ser. No. 13/922,873 filed on Jun. 20, 2013 (now U.S. Pat. No. 8,704,939 issued on Apr. 22, 2014), which claims the benefit under 35 U.S.C. § 119(e) to U.S. Provisional Application No. 61/803,757 filed on Mar. 20, 2013, and under 35 U.S.C. § 119(a) to Korean Patent Application No. 10-2013-0056758 filed on May 20, 2013. This application, PCT International Application No. PCT/KR2014/00134, and U.S. patent application Ser. No. 14/176,851 claim the benefit under 35 U.S.C. § 119(a) to Korean Patent Application No. 10-2014-0007190 filed on Jan. 21, 2014 and International Application No. PCT/KR2013/005493 filed on Jun. 21, 2013. All of these applications are hereby expressly incorporated by reference into the present application.

BACKGROUND OF THE INVENTION

Field of the Invention

The disclosure relates to a mobile device and a method for controlling the same, and more particularly, to a method for controlling a mobile device sensing an image that includes a pattern code.

Discussion of the Related Art

A mobile device may take a one-dimensional code such as a barcode and a two-dimensional code such as a quick response (QR) code by using a camera. Also, the mobile device may have a program and an application, which may detect information by reading the taken code. A bar code and a QR code may exist in a smart phone only, and their related information may be identified directly by consumers. Smart phone users may easily obtain various kinds of information by scanning QR code inserted in a billboard, promotion material, poster, magazine, Internet, etc. through a smart phone after downloading a barcode or QR code scan application free of charge.

For example, if a barcode on a product selling at the mart is touched with a smart phone, a user may know price, information, etc. of the product. Also, for example, if a QR code of a product printed in a paper magazine is touched with a smart phone, the smart phone is connected with a web site of the product, whereby the user may obtain various kinds of product information, event information and coupon benefits. If a QR code of sports event or movie poster is touched with a smart phone, the user may obtain promotion moving picture and photo information, discount coupon and ticket information, theater or stadium information, etc.

SUMMARY OF THE INVENTION

Accordingly, the present disclosure is directed to a mobile device and a method for controlling the same, which substantially obviate one or more problems due to limitations and disadvantages of the related art.

An object of the present disclosure is to provide a mobile device and a method for controlling the same, in which the mobile device may recognize a pattern code and an image generated through a camera, by using a camera application.

Another object of the present disclosure is to provide a mobile device and a method for controlling the same, in which an image or pattern code may be stored easily through a pattern code trigger and an image capturing trigger, which are displayed in a camera application.

Other object of the present disclosure is to provide a mobile device and a method for controlling the same, in which a pattern code trigger and an image capturing trigger are displayed at the same time only if a pattern code image is recognized through a camera application.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a mobile device comprises a camera unit configured to sense an image; a display unit configured to display the image; a sensor unit configured to detect an input signal and transmits the detected input signal to a processor; and the processor configured to control the display unit, the camera unit and the sensor unit, wherein the processor further configured to: provide an image capturing interface, wherein the image capturing interface displays the image sensed by the camera unit and an image capturing trigger for storing the image, simultaneously display a pattern code trigger for storing information of a pattern code in the image capturing interface only when the pattern code is recognized from the image, wherein the information of the pattern code includes at least one of the image of the pattern code and contents linked to the pattern code, stores the image when the input signal for the image capturing trigger is detected, and stores the information of the pattern code when the input signal for the pattern code trigger is detected.

In another aspect of the present invention, a method for controlling a mobile device sensing an image including a pattern code comprises the steps of providing an image capturing interface, wherein the image capturing interface the image and an image capturing trigger for storing the image; simultaneously displaying a pattern code trigger for storing information of the pattern code in the image capturing interface only when the pattern code is recognized from the image, wherein the information of the pattern code includes at least one of the image of the pattern code and contents linked to the pattern code; storing the image when the input signal for the image capturing trigger is detected; and storing the information of the pattern code when the input signal for the pattern code trigger is detected.

To achieve these objects and other advantages and in accordance with the purpose of the invention, as embodied and broadly described herein, a mobile device includes a camera unit configured to sense an image, a display unit configured to display the image, a sensor unit configured to detect an input signal and transmit the detected input signal to a processor, and the processor configured to control the display unit, the camera unit and the sensor unit, wherein the processor is further configured to provide an image capturing interface, wherein the image capturing interface displays the image sensed by the camera unit and an image capturing trigger for storing the image, adjust focus of the image to an area corresponding to a location of a pattern code automatically and simultaneously display a pattern code trigger in the image capturing interface, only when the pattern code is recognized from the image, store the image when an input signal for the image capturing trigger is detected, and display content linked to the pattern code when an input signal for the pattern code trigger is detected.

In another aspect of the present invention, a method for controlling a mobile device sensing an image including a pattern code includes the steps of providing an image capturing interface, wherein the image capturing interface displays the image and an image capturing trigger for storing the image, adjusting focus of the image to an area corresponding to a location of a pattern code automatically and simultaneously displaying a pattern code trigger in the image capturing interface, only when the pattern code is recognized from the image, storing the image when an input signal for the image capturing trigger is detected, and displaying content linked to the pattern code when an input signal for the pattern code trigger is detected.

According to one embodiment, in order to identify information of a pattern code visible to the user, the user may identify the information of the pattern code through a camera application without implementing a separate pattern code application.

Also, according to one embodiment, the user may display a pattern code trigger and an image capturing trigger at the same time through a camera application only when a pattern code among images acquired through a camera is recognized.

Also, according to one embodiment, the user may store the information of the pattern code or adjust a location of the pattern code to a focus of an image, by using the pattern code trigger.

Also, according to one embodiment, when the pattern code is included in the stored image, the user may easily know the information of the pattern code through the pattern code trigger displayed in the stored image.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 15 is a flowchart illustrating a method for controlling a mobile device of the disclosure.

DETAILED DESCRIPTION OF THE EMBODIMENTS

Reference will now be made in detail to the preferred embodiments of the present disclosure, examples of which are illustrated in the accompanying drawings. Wherever possible, the same reference numbers will be used throughout the drawings to refer to the same or like parts.

Although the terms used in the present disclosure are selected from generally known and used terms considering their functions in the present disclosure, the terms can be modified depending on intention of a person skilled in the art, practices, or the advent of new technology. Also, in special case, the terms mentioned in the description of the present disclosure may be selected by the applicant at his or her discretion, the detailed meanings of which are described in relevant parts of the description herein. Accordingly, the terms used herein should be understood not simply by the actual terms used but by the meaning lying within and the description disclosed herein.

Moreover, although the embodiments will be described in detail with reference to the accompanying drawings and the disclosure described by the drawings, it is to be understood that the present disclosure is not limited by such embodiments.

Figure 1:
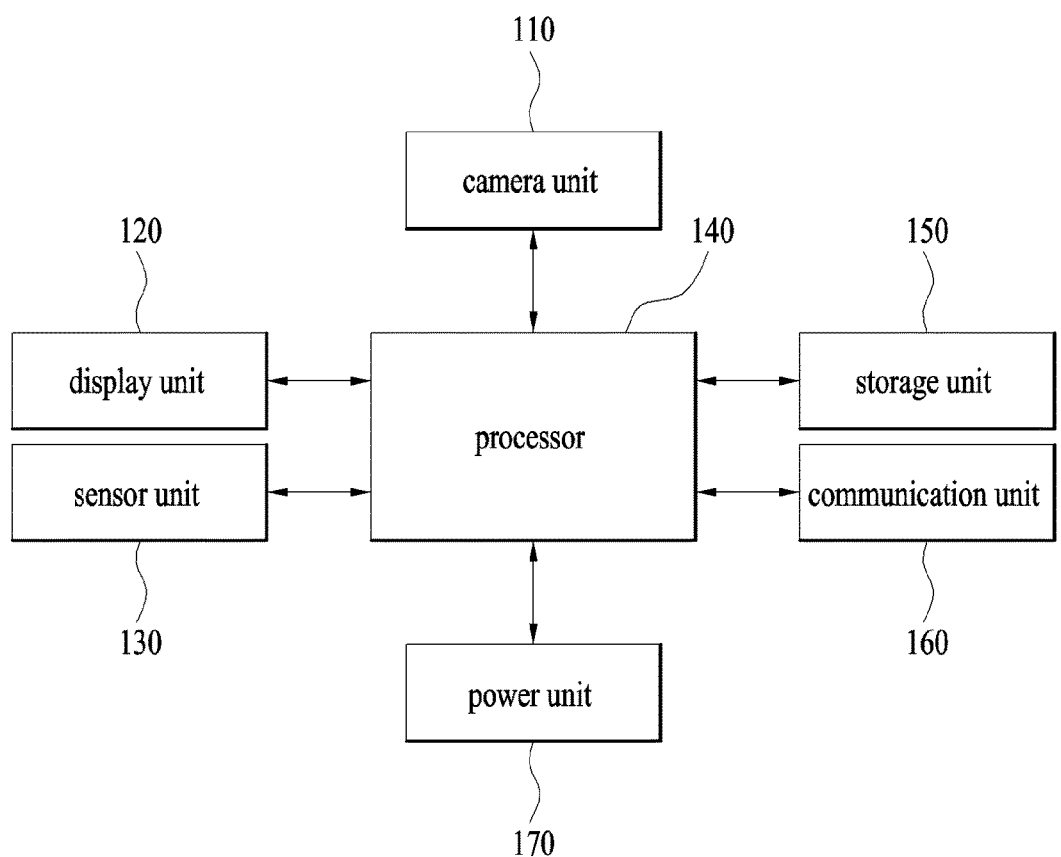
FIG. 1 is a block diagram illustrating a mobile device according to an embodiment of the disclosure.

FIG. 1 is a block diagram illustrating a mobile device according to an embodiment of the disclosure. Referring to FIG. 1, the mobile device 100 may include a camera unit 110, a display unit 120, a sensor unit 130, a processor 140, a storage unit 150, a communication unit 160, and a power unit 170.

First of all, the mobile device 100 may include various digital devices, such as a personal digital assistant (PDA), a notebook computer, a tablet PC, and a smart phone, which may display images and enable data communication. Also, the mobile device 100 may include various digital devices that include a touch screen. In this disclosure, it is assumed that the mobile device 100 is a smart phone.

The camera unit 110 may take an image. In more detail, the camera unit 110 may take an image in a forward direction. In this case, the forward direction may mean a direction towards which the camera unit 110 is oriented. Also, the camera unit 110 may sense an image within a field of view (FOV) area and provide the sensed image to the processor 140. In this case, the field of view area represents a range of horizontal and vertical field of view angles that may be included in a constant screen when an image is sensed. Also, the camera unit 110 may be located on a front surface or a rear surface of the mobile device 100. In this case, the camera unit 110 may sense an image. Also, in this disclosure, the camera unit 110 may sense an image that includes a pattern code.

The display unit 120 may output image data on a display screen. Also, the display unit 120 may output an image on the basis of contents implemented by the processor 140 or a control command of the processor 140. For example, the contents may include various kinds of moving pictures and images.

In this disclosure, the display unit 120 may display an image capturing interface. In this case, the image capturing interface may display an image and an image capturing trigger for storing the image on the display unit 120. Also, the image capturing interface may also display a pattern trigger on the display unit 120 when a pattern code is recognized.

The sensor unit 130 may detect an input signal by using at least one sensor provided in the mobile device 100 and forward the input signal based on the detected result to the processor 140. At this time, the sensor unit 130 may include a plurality of sensing means. In one embodiment, the plurality of sensing means may include a gravity sensor, a terrestrial magnetism sensor, a motion sensor, a gyroscope sensor, an acceleration sensor, an infrared sensor, an inclination sensor, a brightness sensor, an altitude sensor, a smell sensor, a temperature sensor, a depth sensor, a pressure sensor, a bending sensor, an audio sensor, a video sensor, a global positioning system (GPS) sensor, a grip sensor, and a touch sensor. The sensor unit 120 may refer to the aforementioned various sensing means. Also, the sensor unit 120 may sense various inputs of the user and the environment of the user and forward the sensed result to the processor 130, whereby the processor 130 may perform the operation based on the sensed result. The aforementioned sensors may be included in the mobile device 100 as separate elements, or may be incorporated into at least one element.

According to this disclosure, the sensor unit 130 may detect an input signal based on the image capturing interface displayed on the display unit 120. In more detail, the sensor unit 130 may detect the input signal for an image capturing trigger or pattern code trigger displayed on the image capturing interface. In this case, the input signal may include at least one of a touch input, a voice input, and a gesture input.

The processor 140 may implement contents received through data communication or contents stored in the storage unit 150. Also, the processor 140 may control each unit of the mobile device 100 and control data communication between the units.

According to the present disclosure, the processor 110 may display the image sensed by the camera unit 110 and the image capturing trigger for storing the image. Also, in this disclosure, the processor 140 may display pattern code trigger on the image capturing interface only when a pattern code is recognized from the image. Also, in this disclosure, when the input signal for the image capturing trigger is detected, the processor 140 may store the image. Also, in this disclosure, when the input signal for the pattern code trigger is detected, the processor 140 may store information of the pattern code. The operation of the processor 140 will be described with reference to FIG. 2 to FIG. 9.

The storage unit 150 may store various digital data such as moving pictures, audios, photographs and applications. The storage unit 150 may store a program for processing and controlling the processor 140, and may perform a function for temporarily storing input/output data. The storage unit 150 may include various digital data storage areas, such as a flash memory, a random access memory (RAM), and a solid state drive (SSD). In this disclosure, the storage unit 150 may store at least one of the image sensed by the camera unit 110 and the information of the pattern code on the basis of the input signal for the image capturing interface.

In the meantime, in this disclosure, the mobile device 100 may store various digital data such as moving pictures, audios, photographs, and applications in an external storage unit (not shown) in addition to the storage unit 150 therein. In this case, the external storage unit may correspond to an external server that enables data transmission and reception through the communication unit 160. For example, the mobile device 100 may store contents by using a cloud service. In this case, the cloud service represents a service that may store contents of the user, such as movies, photographs and music in a server and use the contents through downloading from the mobile device 100.

The communication unit 160 may transmit and receive data to and from an external device by performing communication with the external device by using various protocols. Also, the communication unit 160 may transmit and receive digital data such as contents to and from a network by accessing the network through the wire or wireless.

The power unit 170 is a power source connected with a battery inside the mobile device 100 or an external power source, and may supply the power to the mobile device 100.

According to one embodiment of the present disclosure, various operations performed by the mobile device 100 may be controlled by the processor 140. Also, the operations of the mobile device 100 may be controlled by applications stored in the storage unit 160 or the external storage unit (not shown) and driven by the processor 140. For convenience of description, in the drawings and the following description, the operations are performed and controlled by the mobile device 100.

FIG. 1 is a block diagram illustrating the mobile device 100 according to one embodiment. In FIG. 1, respective blocks are shown to logically identify the elements of the mobile device 100. Accordingly, the aforementioned elements of the mobile device 100 may be provided as one chip or a plurality of chips in accordance with design of the device.

Figure 2:
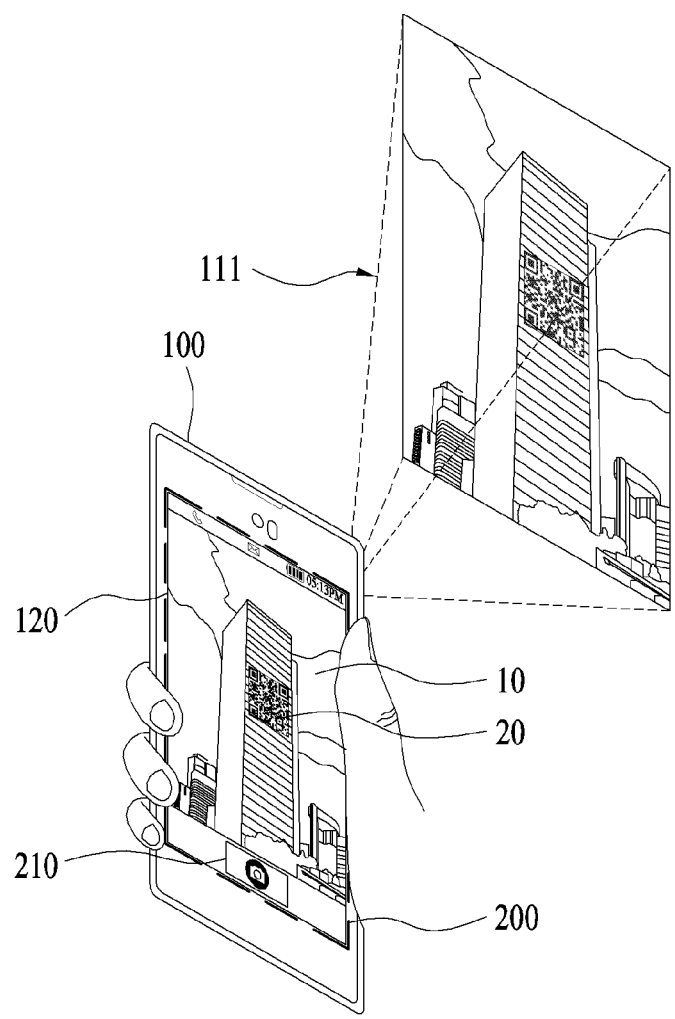
FIG. 2 is a diagram illustrating an example of an image capturing interface of a mobile device according to an embodiment of the disclosure.

FIG. 2 is a diagram illustrating an example of an image capturing interface of a mobile device according to the present disclosure. In more detail, FIG. 2 illustrates an image capturing interface 200 displayed on the display unit 120 of the mobile device 100.

First of all, the mobile device 100 may display the image capturing interface 200 to capture an image. The image capturing interface 200 may correspond to an application implemented to capture the image on the mobile device 100. In this case, the image capturing interface 200 may be displayed on the basis of an input signal of the user for the mobile device 100.

The image capturing interface 200 may display an image 10 sensed by a camera unit (not shown) of the mobile device and an image capturing trigger 210 for storing the image 10. For example, as described with reference to FIG. 1, the mobile device 100 may display the image sensed from a field of view 111 of the camera unit on the image capturing interface 200. In this case, the image capturing trigger 210 may correspond to a software key (button) for capturing the image sensed through the camera unit of the mobile device 100.

In the meantime, referring to FIG. 2, the mobile device 100 may recognize the presence of a pattern code 20 within the field of view 111 of the camera unit (not shown). In this case, the pattern code 20 represents a code in which information desired to be displayed in the pattern is written. For example, the pattern code 20 may include various codes such as a bar code and a quick response (QR) code. The bar code represents a one-dimensional type code represented by combination of vertical sticks of different thicknesses. The QR code represents a matrix type code representing information in a black and white lattice pattern. In this disclosure, it is assumed that the pattern code 20 is the QR code.

The present disclosure is intended to provide a method for easily storing the image 10 or the pattern code 20 on the basis of the input signal when the image 10, which includes the pattern code 20, is sensed from the mobile device 100. In more detail, the present disclosure is intended to provide a method for performing image capturing and pattern code capturing in the mobile device 100 at the same time by using the image capturing interface 200. This method will be described with reference to the embodiments of FIG. 3 to FIG. 10.

Figure 3:
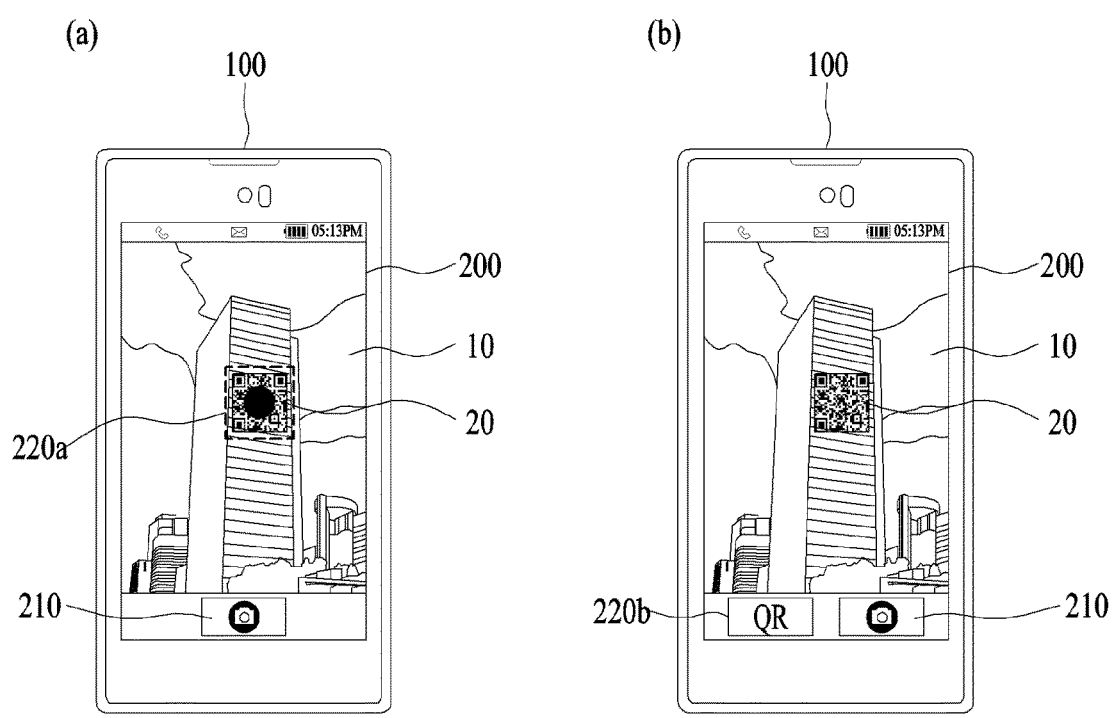
FIG. 3 is a diagram illustrating another example of an image capturing interface of a mobile device according to an embodiment of the disclosure.

FIG. 3 is a diagram illustrating another example of an image capturing interface of a mobile device according to the present disclosure. In more detail, FIG. 3 illustrates that the mobile device 100 displays the image capturing interface 200 where the image capturing trigger 210 and the pattern code trigger 220 are displayed at the same time.

First of all, as described with reference to FIG. 2, the mobile device 100 may implement the image capturing interface 100. For example, the mobile device 100 may implement the image capturing interface 100 on the basis of the input signal of the user. Herein, the input signal of the user may include a touch input, a gesture input, a voice input, etc.

In this case, the mobile device 100 may display the pattern code trigger 220 for storing the information of the pattern code in the image capturing interface 210 simultaneously with the image capturing interface 210 only when the pattern code is recognized from the image within the field of view area. In other words, the mobile device 100 may display the image capturing trigger 210 in the image capturing interface 200 except for the pattern code trigger 220 when the pattern code is not recognized from the image within the field view area.

Herein, the pattern code trigger 220 may display the information of the pattern code 20 or correspond to a software key (button) for storing the information of the pattern code 20. Also, the pattern code trigger 220 may be displayed in the image capturing interface 200.

In one embodiment, referring to FIG. 3(*a*), the mobile device 100 may display a pattern code trigger 220*a* in a location corresponding to the pattern code 20. In this case, the pattern code trigger 220*a* may be displayed in the location corresponding to the pattern code 20 and serve as an indicator indicating the location of the pattern code 20. Also, the pattern code trigger 220*a* may be implemented in various shapes in addition to the shape shown in FIG. 3(*a*). Also, in this case, the pattern code trigger 220 may be used to adjust a focus of the image. For example, the mobile device 100 may adjust the focus of the image to the area corresponding to the pattern code trigger 220 when it detects the input signal for a preset time range with respect to the pattern code trigger 220*a*. Also, for example, the mobile device 100 may store the information of the pattern code when the mobile device 100 detects the input signal for more than the preset time range with respect to the pattern code trigger 220*a*.

Also, the mobile device 100 may display the image capturing trigger 210 at the lower side of the image capturing interface 200. The image capturing trigger 210 may be displayed by being included in the image capturing interface 200, or may be implemented by a hardware key (button) located at the side of the mobile device 100. The image capturing interface 200 shown in FIG. 3(*a*) will be described with reference to FIG. 4 to FIG. 7.

In another embodiment, referring to FIG. 3(*b*), the mobile device 100 may display the pattern code trigger 220 in the area except for the area where the image 10 is displayed by the display unit 120. In this case, the pattern code trigger 220*b* and the image capturing trigger 210 may be displayed in a fixed location within the image capturing interface 200.

Also, the mobile device 100 may display a pattern code indicator (not shown) for identifying the pattern code and a pattern code trigger 220*b* for storing the information of the pattern code in the image capturing interface 200. In this case, the mobile device 100 may store or display at least one of the image of the pattern code 20 and contents linked to the pattern code 20 when the mobile device 100 detects the input signal for the pattern code trigger 220*b*.

Also, the mobile device 100 may display the pattern code trigger 220*b* in various manners by identifying the type of the pattern code 20. For example, as shown in FIG. 3(*b*), when the pattern code 20 corresponding to the QR code is identified, the mobile device 100 may display 'QR' in the pattern code trigger 220*b*. Also, for example, when the pattern code corresponding to the bar code is identified, the mobile device 100 may display 'BAR' in the pattern code trigger 220*b*. The image capturing interface 200 shown in FIG. 3(*b*) will be described with reference to FIG. 8 to FIG. 10.

FIG. 4 is a diagram illustrating an example of image capturing based on an image capturing interface according to the present disclosure. In more detail, FIG. 4 illustrates that the image capturing interface 200 of the mobile device 100 detects the input signal for the pattern code trigger 220*a*.

First of all, when the input signal is detected, the mobile device 100 may display the image capturing interface 200 on the display unit. As described with reference to FIG. 3(*a*), the mobile device 100 may display the pattern code trigger 220*a* in the image capturing interface 200 only when the pattern code 20 is recognized from the image sensed through the camera unit. Herein, the pattern code trigger 220*a* may be used to store or display the information of the pattern code 20 as described with reference to FIG. 3. For example, the information of the pattern code may include the image of the pattern code 20, contents linked to the pattern code 20, etc.

Also, the pattern code trigger 220*a* may be used to adjust the focus of the image as described with reference to FIG. 3. In this case, the mobile device 100 may use the pattern code trigger 220*a* to adjust the focus or store the information of the pattern code on the basis of the sustain time of the input signal for the pattern code trigger 220*a*.

Next, the mobile device 100 may detect the input signal for the pattern code trigger 220*a*. In this case, the input signal for the pattern code trigger 220*a* may correspond to the input signal for the preset time range. For example, the preset time range may correspond to one second to three seconds. In other words, when the input signal is detected for one second to three seconds, the mobile device 100 may recognize the input signal as the input of the preset time range. Also, the input signal for the pattern code trigger 220a may correspond to the signal based on a touch input and a gesture input.

Figure 4A:
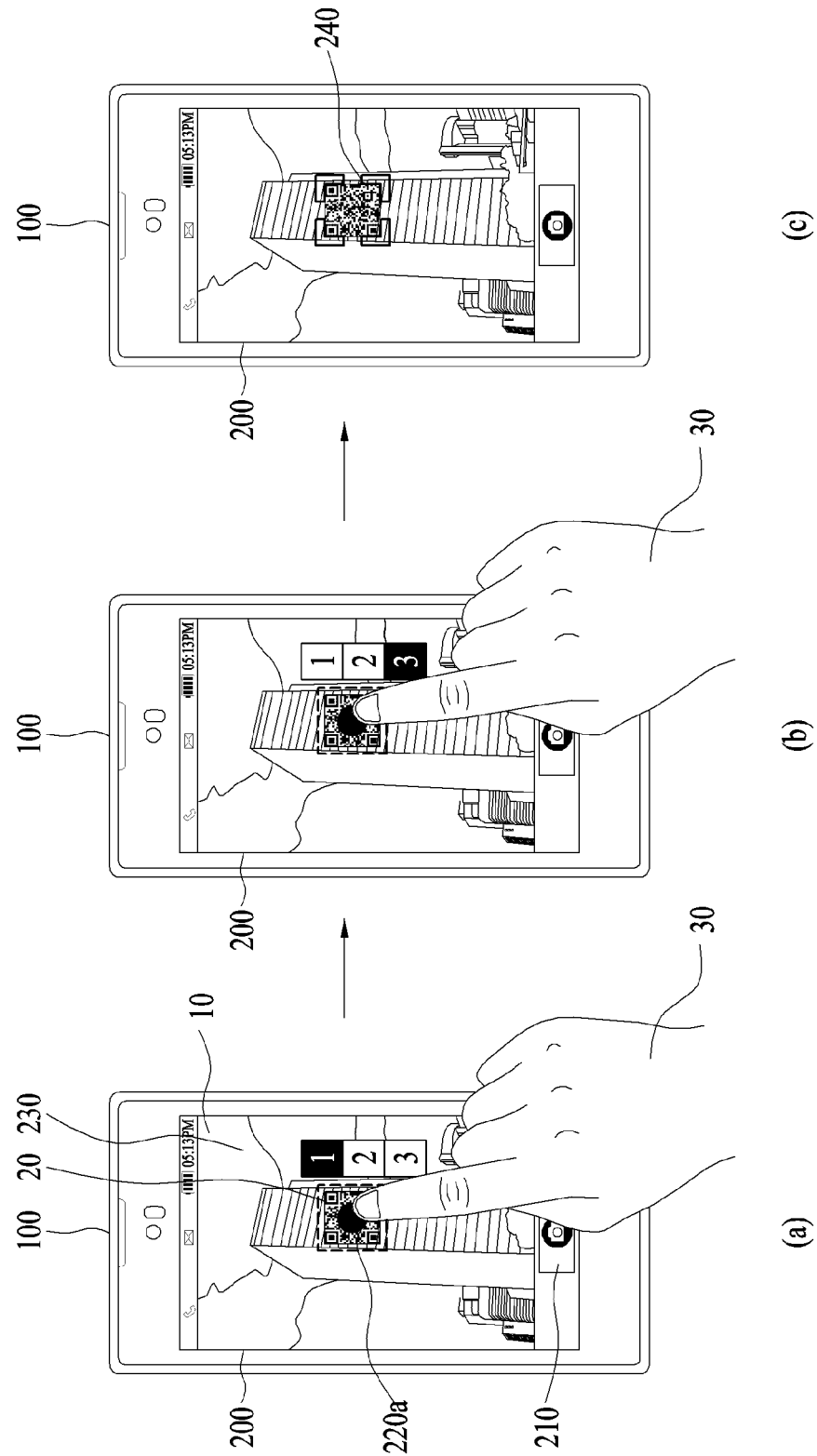
FIG. 4 is a diagram illustrating an example of image capturing based on an image capturing interface according to an embodiment of the disclosure.

In the meantime, when the mobile device detects the input signal for the pattern code trigger 220a, the mobile device 100 may display a time indicator 230 indicating the input time for the pattern code trigger 220a. Herein, the time indicator 230 may represent the time when the input signal for the pattern code trigger 220a is maintained. Referring to FIGS. 4A and 4B, the mobile device 100 may represent, through the time indicator 230, that the input signal for the pattern code trigger 220a is maintained for three seconds with the preset time range. Through the time indicator 230, the user 30 may identify how long the user input for the pattern code trigger 220a is maintained.

Next, the mobile device 100 may adjust the focus of the image 10 to the area corresponding to the location of the pattern code 20 in accordance with the input signal for the pattern code trigger 220a for the preset time range. In this case, referring to FIG. 4A(c), the mobile device 100 may display a focus indicator 240 in the area corresponding to the location of the pattern code 20 to indicate that the focus of the image 10 has been adjusted to the pattern code 20. Herein, the focus indicator 240 may indicate the focus of the image 10. The user 30 may adjust the focus of the image 10 through the input for the pattern code trigger 220a not the focus indicator 240.

In the meantime, although not shown in FIG. 4A, when the mobile device 100 detects the input signal for another area on the image 10 not the area corresponding to the pattern code 20, the mobile device 100 may adjust the location of the focus to the detected area. In this case, the mobile device 100 may display the focus indicator 240 in the area where the input signal is detected.

Next, the mobile device 100 may detect the input signal for the image capturing trigger 210 after adjusting the focus of the image 10 to the area corresponding to the location of the pattern code trigger 220a. Referring to FIG. 4B, the input signal for the image capturing trigger 210 may include a touch input and gesture input of the user 30. In this case, the mobile device 100 may store the image 10 in a state that the focus of the image 10 is located in the area corresponding to the pattern code trigger 220a.

In one embodiment, when the input signal for the image capturing trigger 210 is detected, the mobile device 100 may store the image 10 and the image of the pattern code 20 included in the image 10. As described with reference to FIG. 1, the mobile device 100 may store the image 10 and the image of the pattern code 20 in its inner storage unit or external storage unit.

In this regard, the mobile device 100 may differently set storage paths of the image 10 and the image of the pattern code 20. In this case, as described in FIG. 4B(b), the mobile device 100 may identify an image 10a from a gallery 1 300_a and identify the image 20a of the pattern code from a gallery 2 300_b, wherein the gallery 1 300_a and the gallery 2 300_b are the storage paths different from each other. Herein, the gallery 300 may correspond to the means that may allow the user to identify the stored image after the image is stored.

Also, when the input signal for the image capturing trigger 210 is detected, the mobile device 100 may equally set the storage paths of the image 10 and the image of the pattern code 20. In this case, the mobile device 100 may store the image 10a and the image 20a of the pattern code in one gallery (not shown) in due order.

Figure 4C:
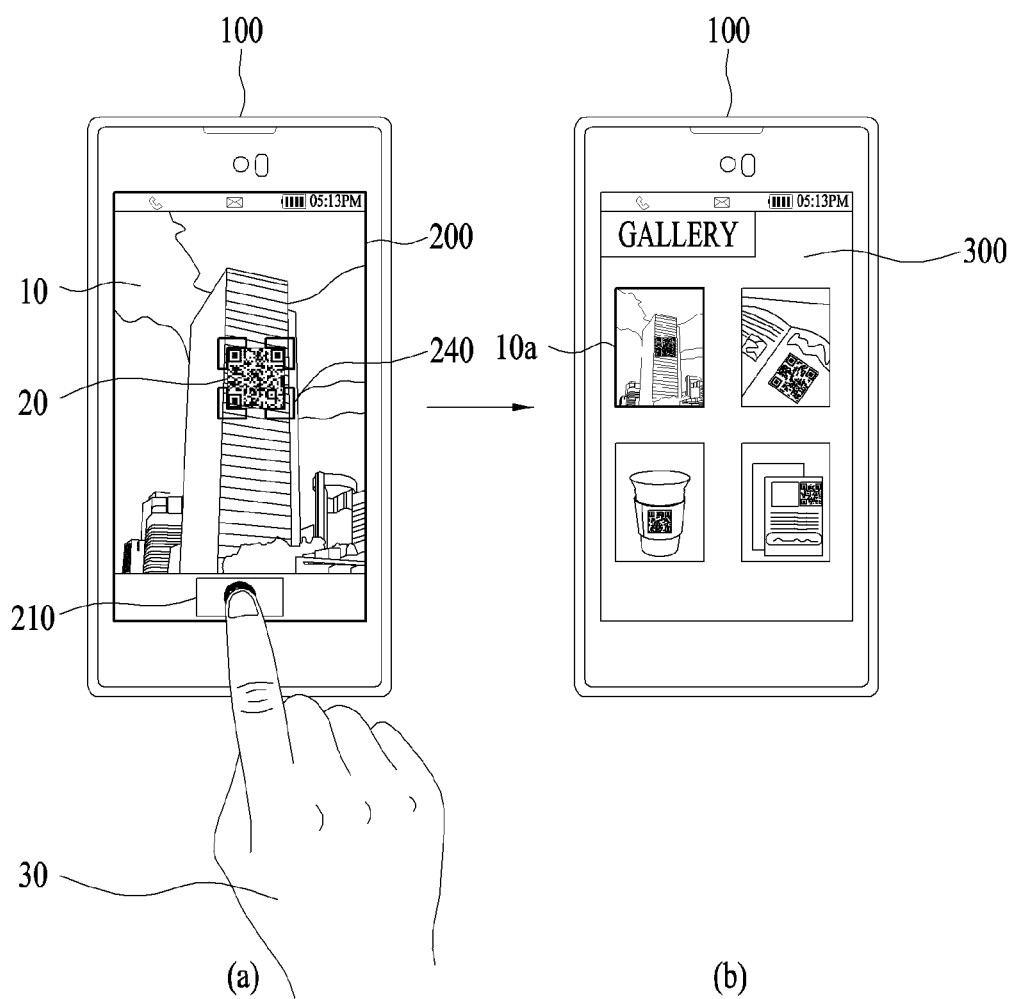

In another embodiment, when the input signal for the image capturing trigger 210 is detected, the mobile device 100 may store the image 10. In more detail, the mobile device may store the image 10a in its inner storage unit or external storage unit. In this case, as shown in FIG. 4C(b), the mobile device 100 may identify that the image 10, which includes the pattern code 20, is stored in the gallery 300. In the meantime, when the mobile device 100 detects the input signal for the stored image 10a, the mobile device 100 may display the information of the pattern code 20. This will be described with reference to FIG. 5.

Figure 5:
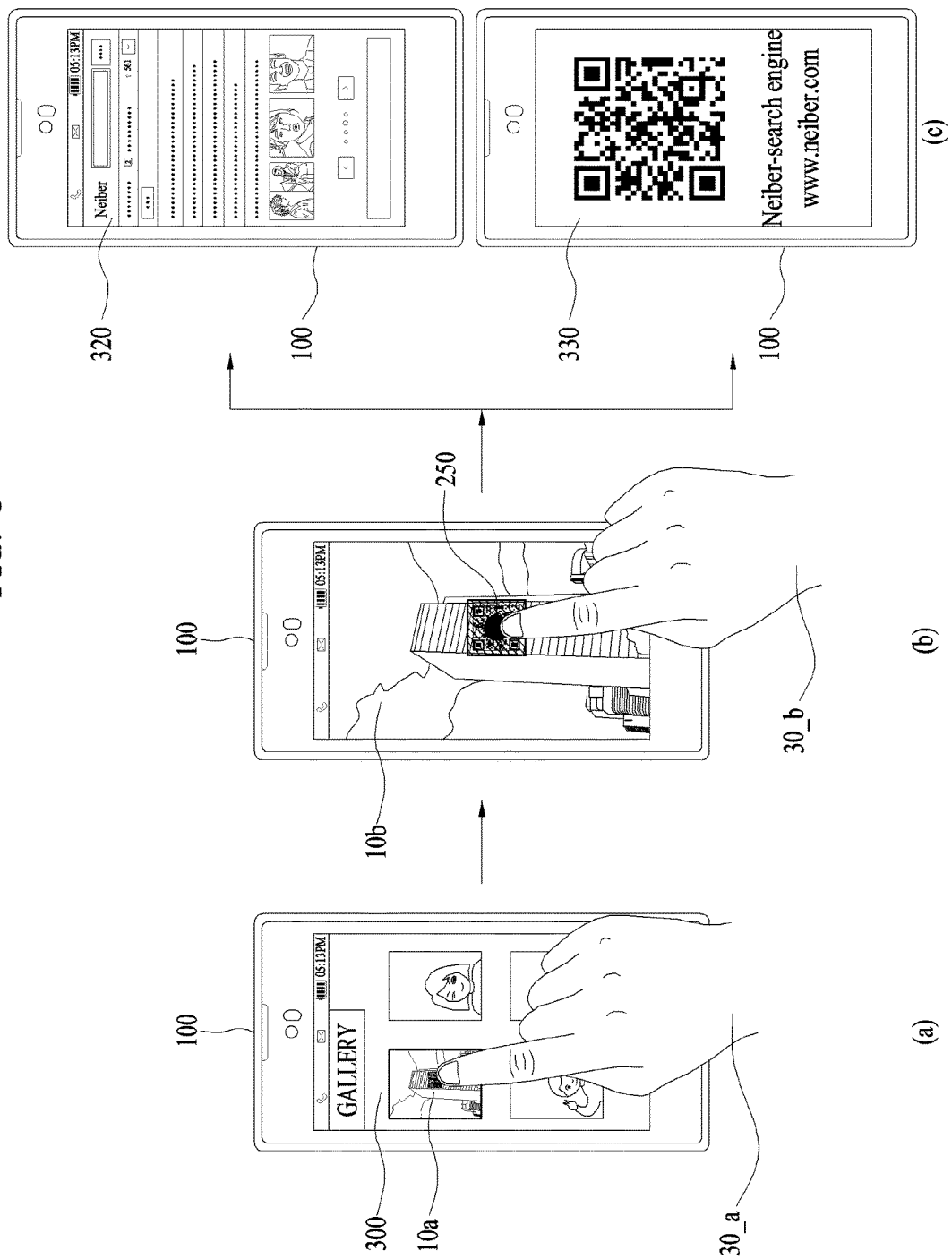
FIG. 5 is a diagram illustrating an example of an image gallery of a mobile device according to an embodiment of the disclosure.

FIG. 5 is a diagram illustrating an example of an image gallery of a mobile device according to the present disclosure. In more detail, when the input signal for the image 10 including the pattern code 20 stored in the mobile device 100 is detected, the mobile device 100 displays the information of the pattern code 20.

First of all, as described with reference to FIG. 4C, when the input signal for the image capturing trigger 210 is detected, the mobile device 100 may store the image 10. Next, the mobile device 100 may detect an input signal for a thumbnail image 10a displayed in the gallery 300. Herein, the input signal may correspond to a signal based on a touch input and a gesture input of a user 30_a. The mobile device 100 may display the thumbnail image 10a in the display unit by enlarging the thumbnail image 10a.

Next, the mobile device 100 may display an additional trigger 250 in the area corresponding to the location of the pattern code included in the enlarged image 10b. Herein, the additional trigger 250 may represent that the pattern code is included in the stored image. Also, the additional trigger 250 may be used to display the image of the pattern code, contents linked to the pattern code, etc. Then, the mobile device 100 may detect an input signal for the additional trigger 250. In this case, the input signal for the additional pattern code trigger 250 may include a signal based on a touch input and a gesture input of the user 30_b.

Next, the mobile device 100 may display the contents linked to the pattern code on the basis of the detected input signal. For example, the mobile device 100 may display a home page of the contents linked to the pattern code as shown at the upper side of FIG. 5(c). In other words, the user 30 may easily use the contents linked to the pattern code included in the image 10a through the additional trigger 250. Also, for example, as shown at the lower side of FIG. 5(c), the mobile device 100 may display the image and title 330 of the pattern code. In this case, the title of the pattern code may correspond to name and description of the contents linked to the pattern code.

FIG. 6 is a diagram illustrating an example of pattern code capturing of an image capturing interface of a mobile device according to the present disclosure. In more detail, FIG. 6 illustrates that the image capturing interface 200 of the mobile device 100 detects the input signal for the pattern code trigger 220a.

First of all, as described with reference to FIG. 4, when the input signal is detected, the mobile device 100 may display the image capturing interface 200 on the display unit. As described with reference to FIG. 3(a), the mobile device 100 may display the pattern code trigger 220a and the image capturing trigger 210 in the image capturing interface 200 at the same time only when the pattern code 20 is recognized from the image sensed through the camera unit.

Herein, the mobile device 100 may use the pattern code trigger 220*a* to adjust the focus or store the information of the pattern code on the basis of the sustain time of the input signal for the pattern code.

Figure 6A:
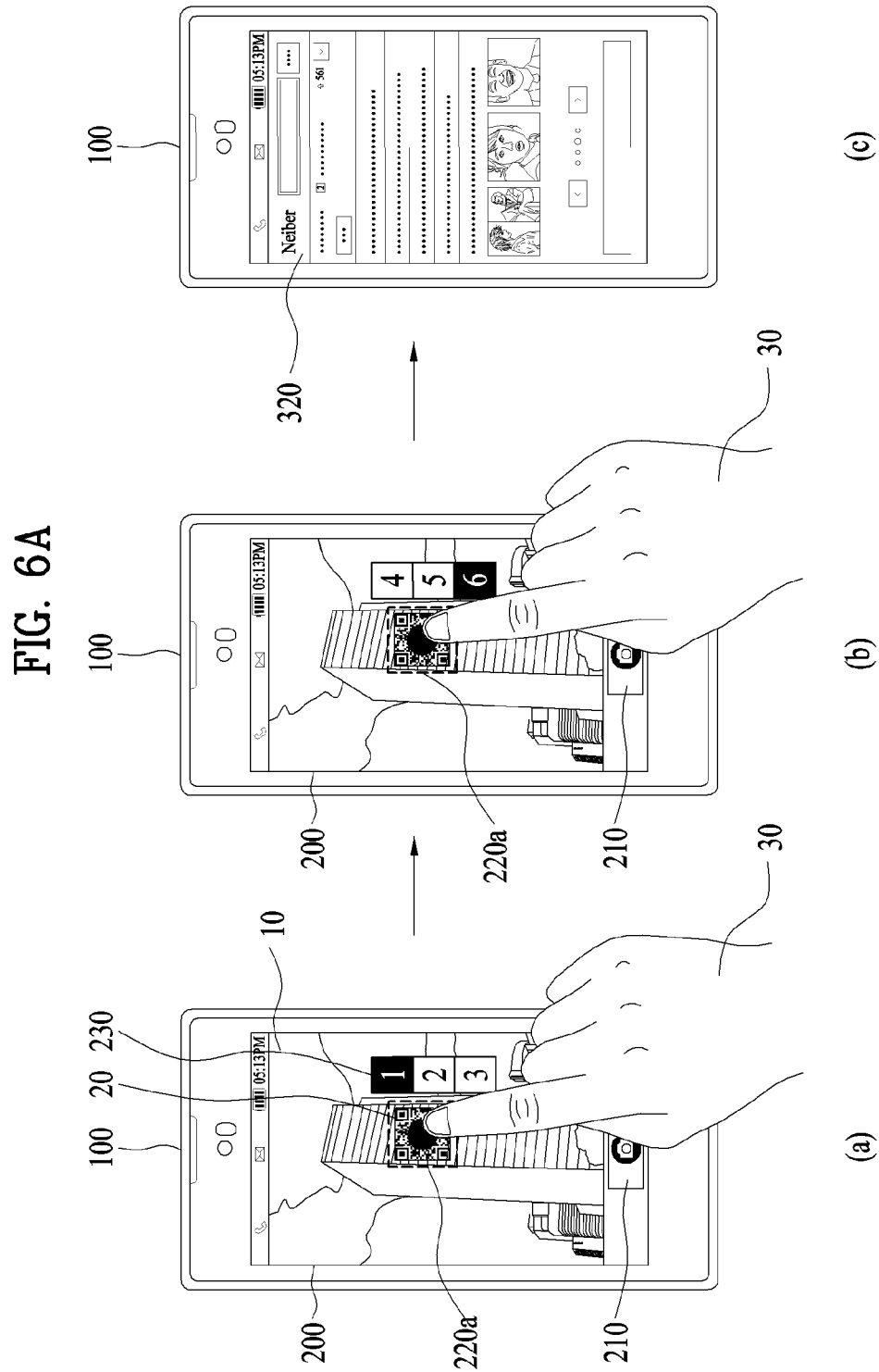
FIG. 6 is a diagram illustrating an example of pattern code capturing of an image capturing interface of a mobile device according to an embodiment of the disclosure.

Next, the mobile device 100 may detect the input signal for the pattern code trigger 220*a*. Herein, the input signal for the pattern code trigger 220*a* may correspond to the input signal that exceeds the preset time range. For example, the preset time range may correspond to one second to three seconds. Also, as described with reference to FIG. 4, the mobile device 100 may display the time indicator 230 indicating the input time for the pattern code trigger 220*a*. Referring to FIGS. 6A(a) and 6A(b), the mobile device 100 may detect the input signal for the pattern code trigger 220*a* for six seconds. In this case, the mobile device may determine the input signal for six seconds as the input signal that exceeds the preset time range.

Next, the mobile device 100 may display or store the information of the pattern code 20 on the display unit on the basis of the input signal that exceeds the detected preset time range. In one embodiment, referring to FIG. 6A, the mobile device may display the information of the pattern code 20 on the basis of the input signal that exceeds the detected preset time range.

Herein, the information of the pattern code 20 may include at least one of the image of the pattern code and the contents linked to the pattern code. For example, the contents linked to the pattern code may include thumbnail image of the contents linked to the pattern code, title of the contents linked to the pattern code, etc. Referring to FIG. 6A, the mobile device 100 may display the contents 320 linked to the pattern code on the display unit on the basis of the input signal that exceeds the preset time range. As a result, the user 30 may easily use the contents linked to the pattern code through the input for the pattern code trigger 220*a* in the image capturing interface 200.

In another embodiment, referring to FIG. 6B, the mobile device 100 may store the information of the pattern code 20 on the basis of the input signal that exceeds the detected preset time range. For example, referring to FIG. 6B, the mobile device 100 may store the thumbnail image 40 of the contents linked to the pattern code 20. For example, the thumbnail image of the contents linked to the pattern code 20 may correspond to the image of the thumbnail of the first screen of the contents linked to the pattern code.

Also, although not shown in FIG. 6B, when the input signal for the thumbnail image 40 displayed in the gallery 340 is detected, the mobile device 100 may display the contents linked to the pattern code on the display unit. In other words, the mobile device 100 may display the contents corresponding to the thumbnail image 40 shown in FIG. 6B(c) by enlarging the contents.

Figure 6C:
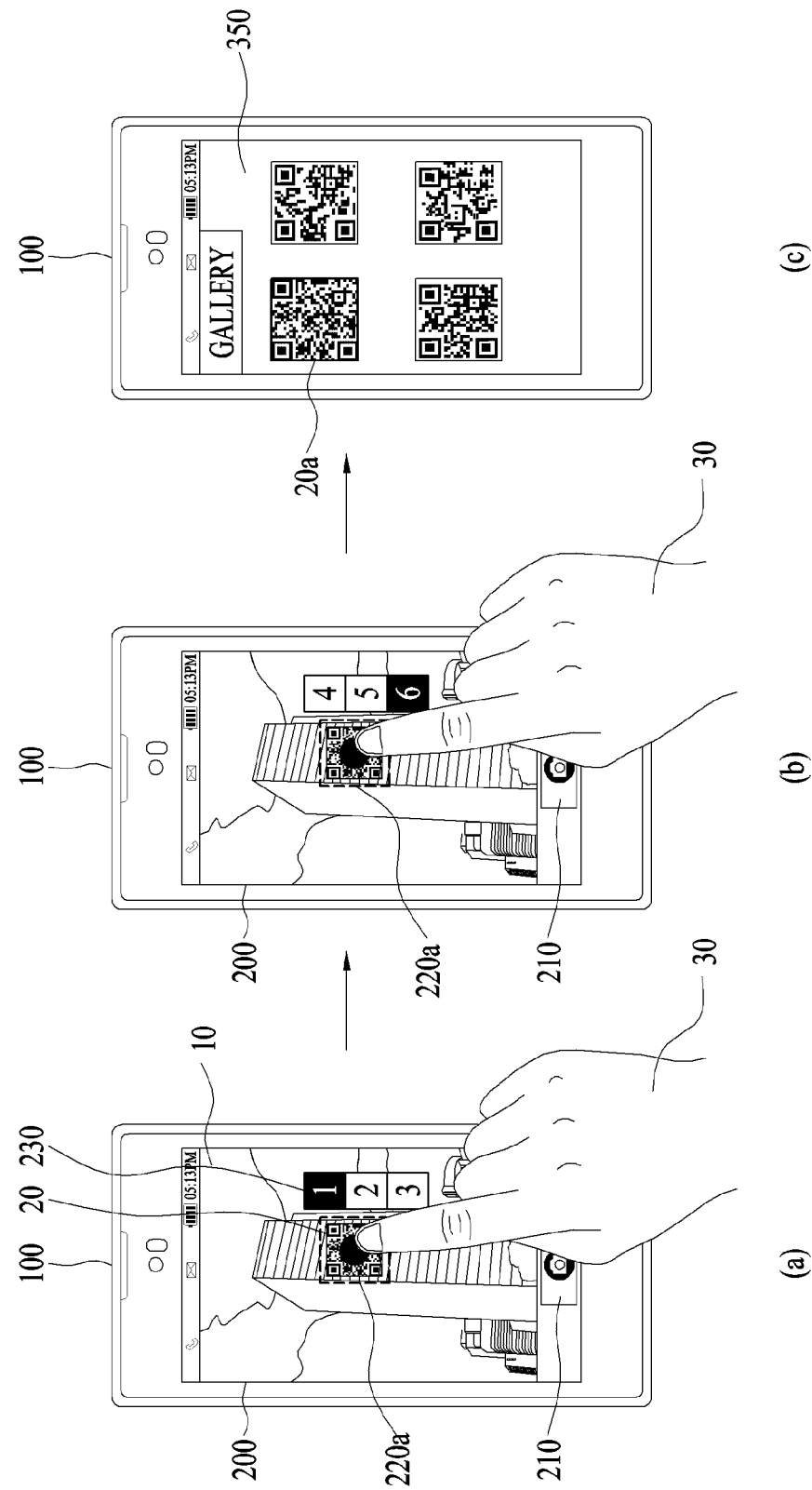

Also, for example, referring to FIG. 6C, the mobile device may store the image 20*a* of the pattern code 20 on the basis of the input signal that exceeds the detected preset time range. Accordingly, the user 30 may easily store the information of the pattern code 20 through the input for the pattern code trigger 220*a* in the image capturing interface 200. In this case, when the mobile device 100 detects the input signal for the image of the pattern code stored in the gallery 350, the mobile device 100 may display the information of the pattern code. This will be described with reference to FIG. 7.

Figure 7:
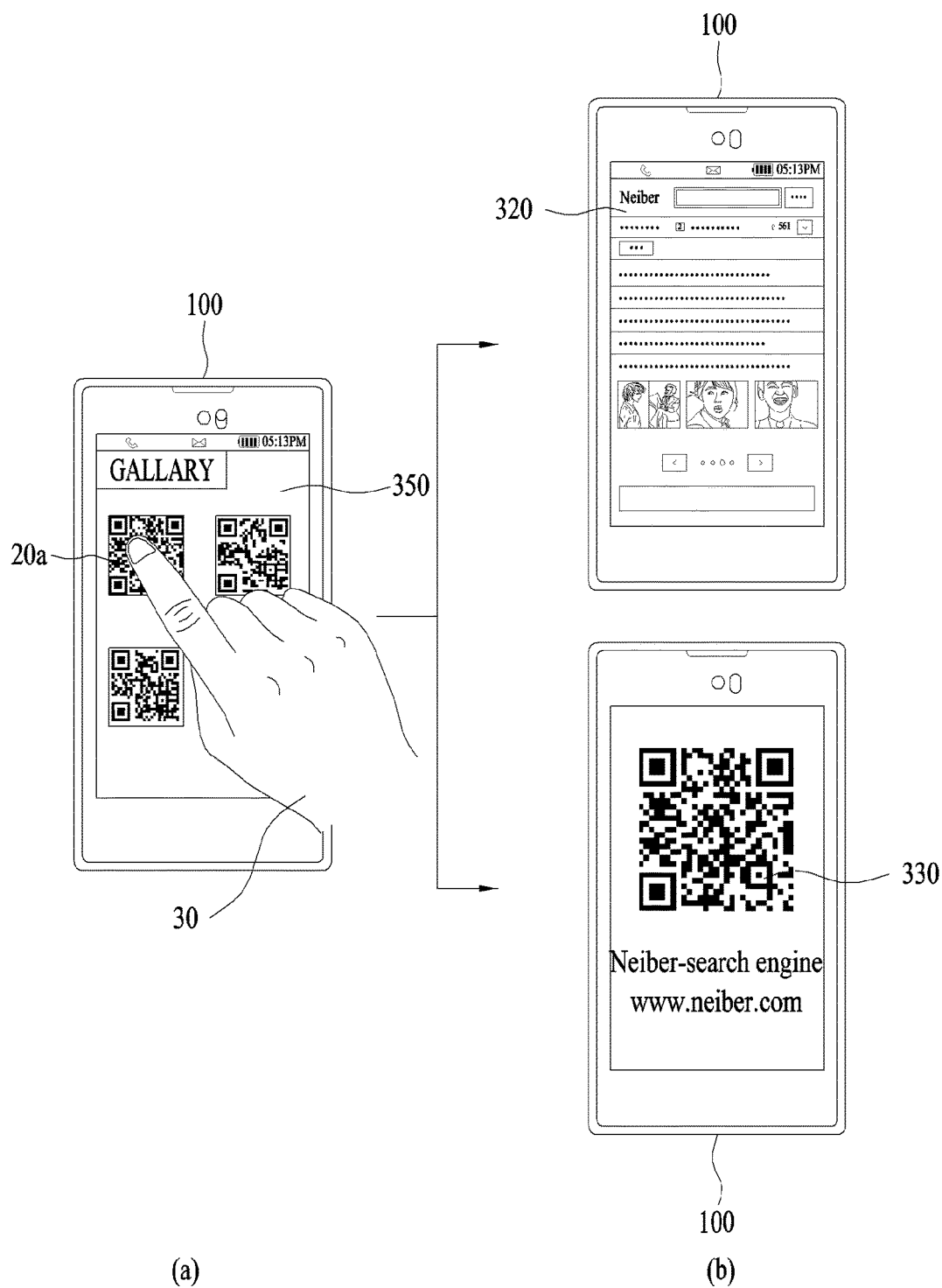
FIG. 7 is a diagram illustrating another example of an image gallery of a mobile device according to an embodiment of the disclosure.

FIG. 7 is a diagram illustrating another example of an image gallery of a mobile device according to the present disclosure. In more detail, FIG. 7 illustrates that the input signal for the image of the pattern code stored in the mobile device 100 is detected as shown in FIG. 6C.

First of all, as described with reference to FIG. 6C, the mobile device 100 may store the image of the pattern code 20. Next, the mobile device 100 may detect the input signal of the image of the pattern code stored in the gallery 350. In this case, the input signal for the image of the pattern code may correspond to the touch input and the gesture input of the user 30.

Next, the mobile device 100 may display the information of the pattern code on the display unit on the basis of the detected input signal. For example, the mobile device 100 may display the contents linked to the pattern code as shown at the upper side of FIG. 7(*b*). Also, for example, as shown at the lower side of FIG. 7(*b*), the mobile device 100 may display the enlarged image of the contents linked to the pattern code and title 330. In this case, the user 30 may easily access the information and contents associated with the pattern code 20*a* by using the stored pattern code 20*a*.

Figure 8:
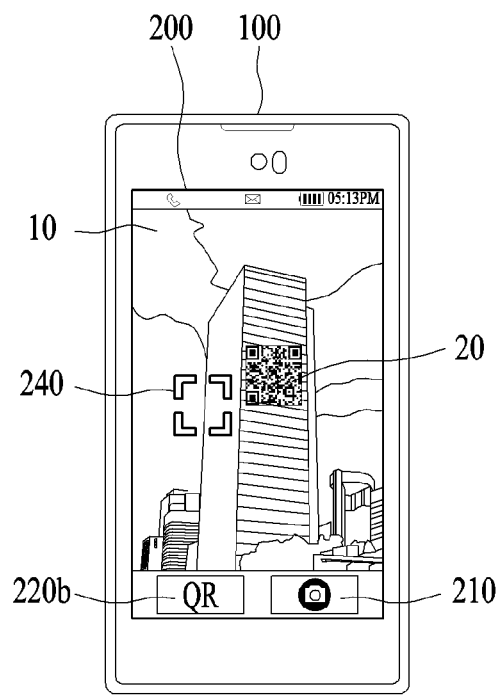
FIG. 8 is a diagram illustrating still another example of an image capturing interface of a mobile device according to an embodiment of the disclosure.
Figure 8:
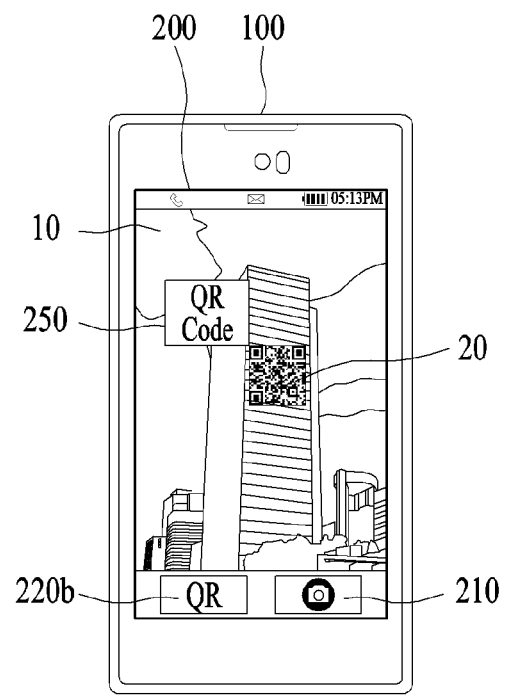

FIG. 8 is a diagram illustrating still another example of an image capturing interface of a mobile device according to the present disclosure. In more detail, FIG. 8 illustrates an indicator displayed in the image capturing interface 200 when the pattern code trigger 220*b* is displayed on the area other than the image 10 on the display unit.

As described with reference to FIG. 3, when the pattern code 20 is recognized from the image 10, the mobile device 100 may display the pattern code trigger 220*b* in the image capturing interface 200. Also, the mobile device 100 may display the pattern code trigger 220*b* at the fixed location of the image capturing trigger 210. For example, referring to FIG. 8, the mobile device 100 may display the pattern code trigger 220*b* at the left side with respect to the image capturing trigger 210.

Referring to FIG. 8(*a*), the mobile device 100 may separately display the focus indicator 240 in the image capturing interface 200. In other words, as the focus may be adjusted using the pattern code trigger 220*a* in FIG. 4, a separate focus indicator is not required to be displayed. However, since the pattern code trigger 220*b* is displayed at the fixed location in FIG. 8, the focus indicator 240 is required separately.

Also, referring to FIG. 8(*b*), when the mobile device 100 recognizes the pattern code 20 from the sensed image 10, the mobile device 100 may display the pattern code trigger 220*b* and the pattern code indicator 250. Herein, the pattern code indicator 250 may represent that the pattern code 20 exists in the sensed image 10. Also, the pattern code indicator 250 may represent size, location and type of the pattern code. This is intended to allow the user to easily recognize the pattern code 20 from the sensed image 10 through the separate indicator when the mobile device 100 is difficult to easily identify the pattern code from the sensed image.

Also, the pattern code indicator 250 may be displayed as various types. For example, as shown in FIG. 8(*b*), the pattern code indicator 250 may be displayed as text to adjoin the location of the pattern code 20. Also, for example, the pattern code indicator 250 may be displayed by highlighting the location corresponding to the pattern code 20 or highlighting the boundary of the pattern code 20.

Figure 9:
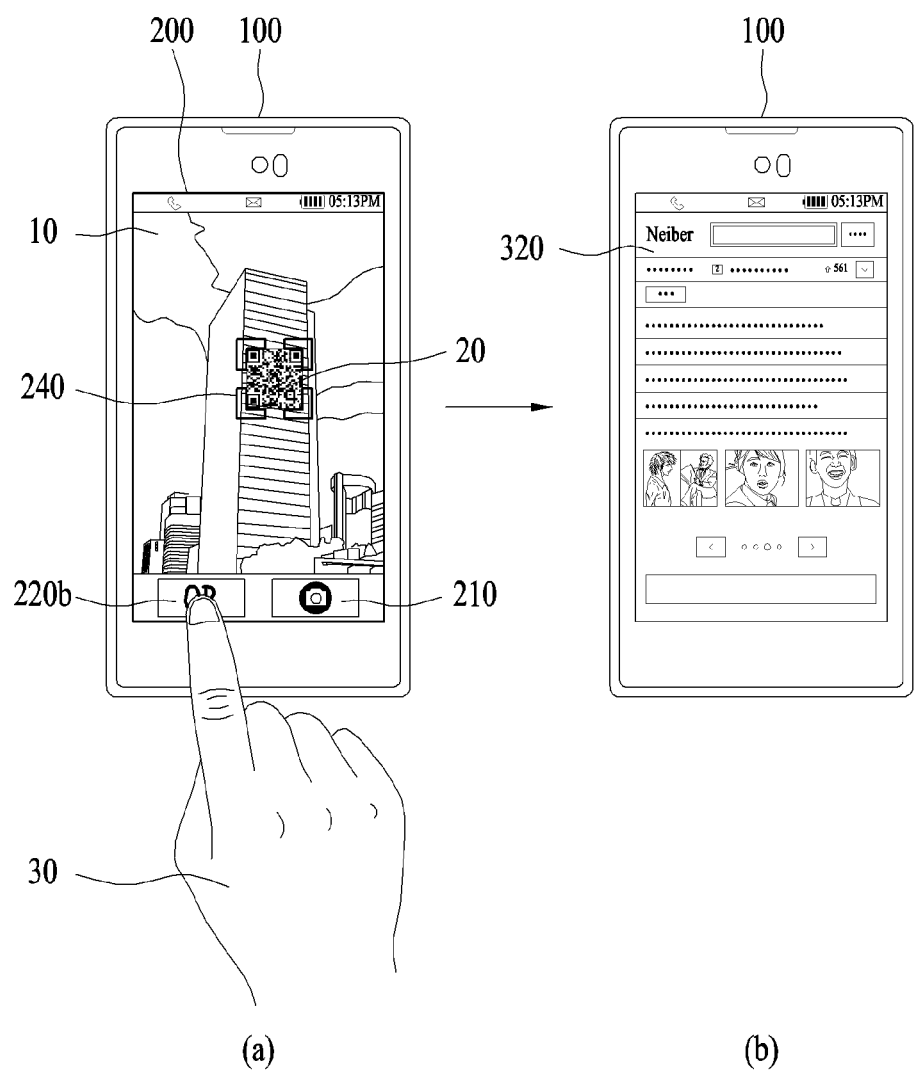
FIG. 9 is a diagram illustrating another example of pattern code capturing of an image capturing interface of a mobile device according to an embodiment of the disclosure.

FIG. 9 is a diagram illustrating another example of pattern code capturing of an image capturing interface of a mobile device according to the present disclosure. In more detail, FIG. 9 illustrates that the image capturing interface 200 of the mobile device 100 detects the input signal for the pattern code trigger 220*a*.

First of all, as described with reference to FIG. 4, when the input signal is detected, the mobile device 100 may display the image capturing interface 200 on the display unit. As shown in FIG. 9, the pattern code trigger 220b may be fixed to the lower side of the display unit and may be displayed sequentially with the image capturing trigger 210. Herein, the pattern code trigger 220b may be used to store the information of the pattern code 20 or display the information of the pattern code 20.

Next, the mobile device 100 may detect the input signal for the pattern code trigger 220b. In this case, the input signal for the pattern code trigger 220b is irrelevant to the sustain time and may include a touch input and a gesture input of the user 30. Then, the mobile device 100 may display or store the information of the pattern code 20 on the basis of the detected input signal.

For example, referring to FIG. 9, the mobile device 100 may display the contents linked to the pattern code 20 on the display unit. Also, as shown in FIG. 6, the mobile device may store the image of the pattern code 20 to correspond to the input signal for the pattern code trigger 220b.

Also, as shown in FIG. 6, the mobile device 100 may store thumbnail of the contents linked to the pattern code 20 to correspond to the input signal for the pattern code trigger 220b. Through the aforementioned embodiment, the user 30 may simply use the information of the pattern code through the image capturing interface 200.

Figure 10:
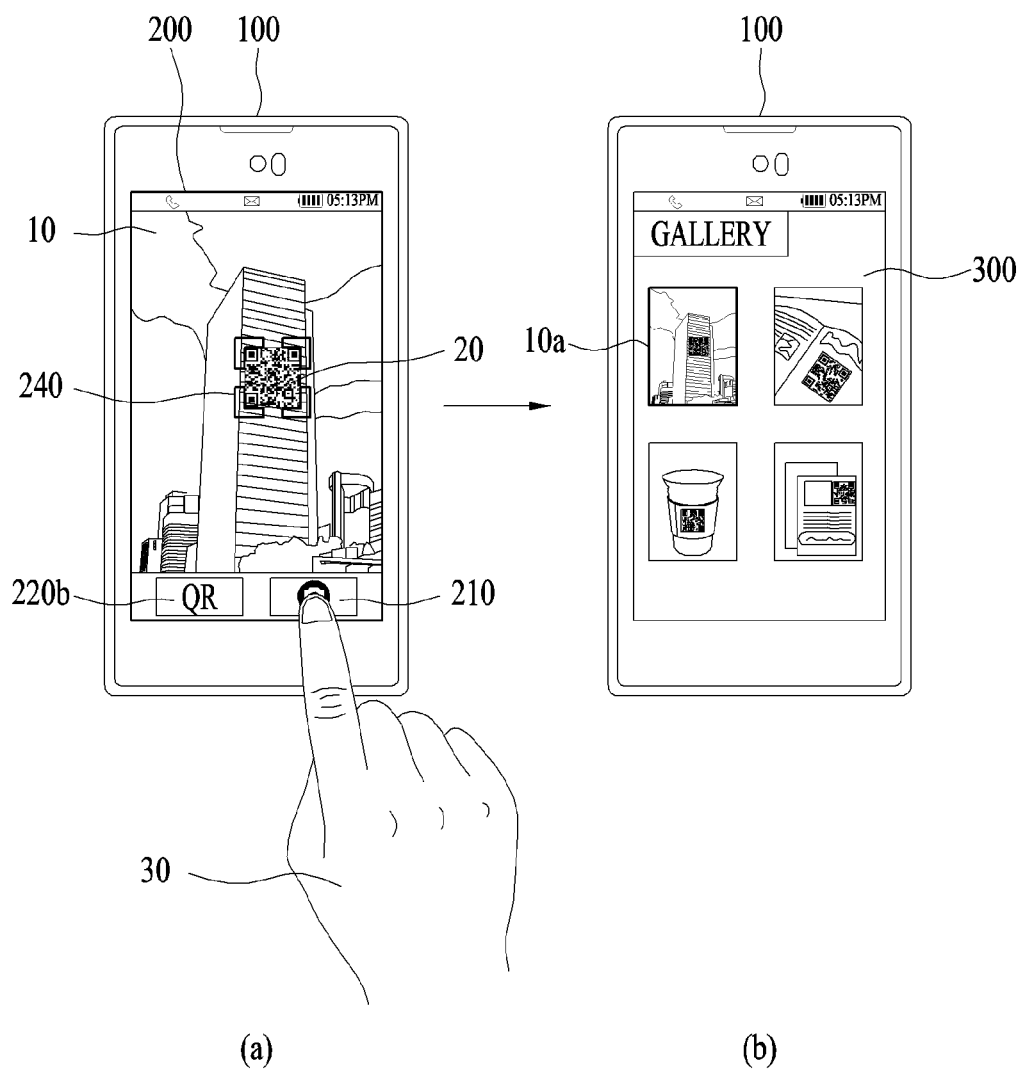
FIG. 10 is a diagram illustrating another example of image capturing based on an image capturing interface according to an embodiment of the disclosure.

FIG. 10 is a diagram illustrating another example of image capturing based on an image capturing interface according to the present disclosure. In more detail, FIG. 10 illustrates that the image capturing interface 200 of the mobile device 100 detects the input signal for the image capturing trigger 210.

First of all, when the input signal is detected, the mobile device 100 may display the image capturing interface 200 on the display unit. Referring to FIG. 10, as the pattern code 20 is recognized from the sensed image, the mobile device 100 may additionally display the pattern code trigger 220b in the image capturing interface 200.

Next, the mobile device 100 may detect the input signal for the image capturing trigger 210. For example, the mobile device may detect the input signal for the image capturing trigger 210 after the focus of the image is adjusted using the focus indicator 240 displayed in the image capturing interface 200. In this case, the mobile device 100 may store the image to correspond to the detected input signal.

For example, referring to FIG. 10, the mobile device 100 may store the image 10, which includes the pattern code 20, to correspond to the detected input signal. Also, for example, as described with reference to FIG. 5, the mobile device 100 may store the image 10, which includes the pattern code, and the image of the pattern code 20 to correspond to the detected input signal. In this case, the mobile device 100 may differently set the storage paths of the image 10, which includes the pattern code 20, and the image of the pattern code 20. Alternatively, the mobile device 100 may set equally the storage paths of the image 10, which includes the pattern code 20, and the image of the pattern code 20.

Figure 11:
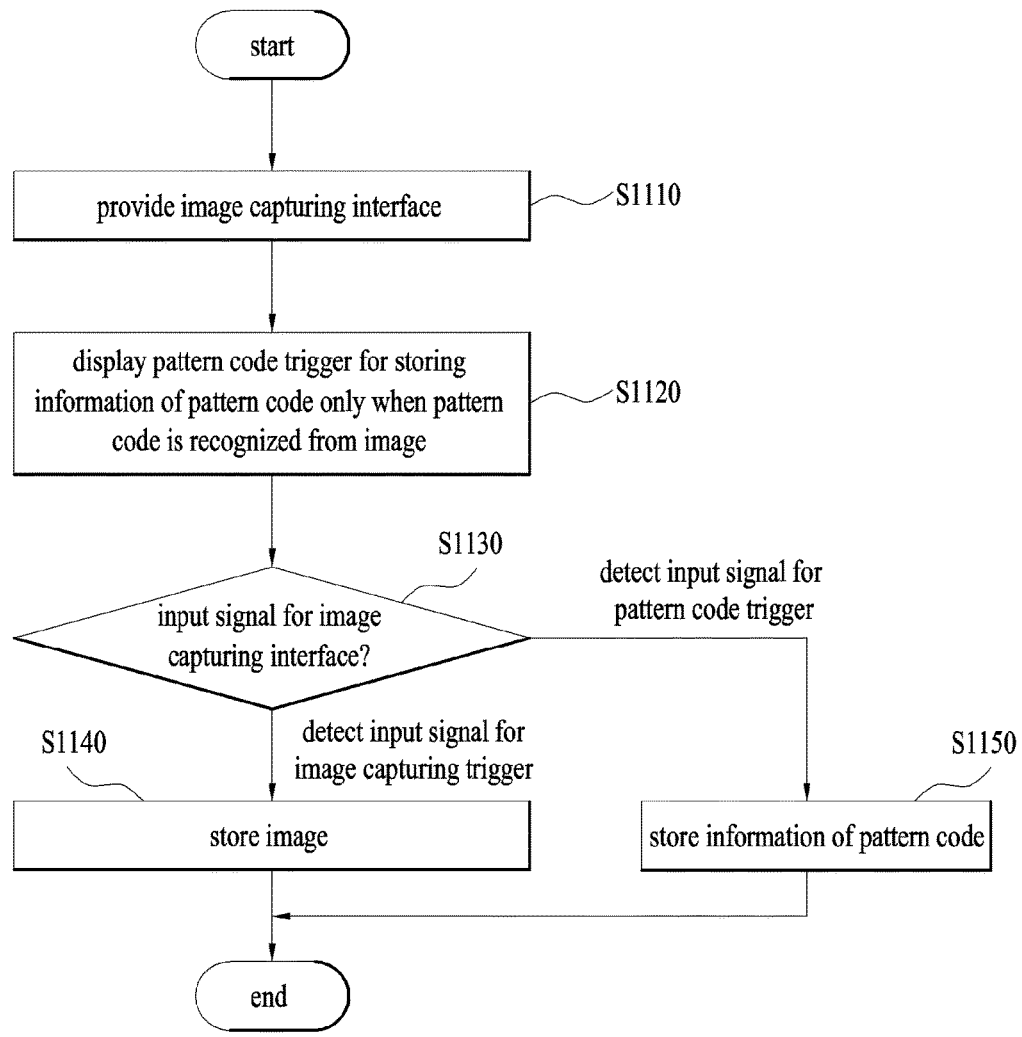
FIG. 11 is a flow chart illustrating a method for controlling a mobile device of the present invention.

FIG. 11 is a flow chart illustrating a method for controlling a mobile device of the present invention. Hereinafter, each step of FIG. 11, which will be described later, may be controlled by the processor 140 of the mobile device 100 shown in FIG. 1.

First of all, the mobile device may provide the image capturing interface (S1110). In this case, the image capturing interface may display the image sensed by the camera unit and the image capturing trigger for storing the image. For example, the image capturing trigger may be implemented in the image capturing interface by a software key, or may be implemented at the side of the mobile device by a hardware key.

Next, the mobile device may simultaneously display the pattern code trigger for storing the information of the pattern code in the image capturing interface only when the pattern code is recognized from the image (S1120). Herein, the information of the pattern code may include at least one of the image of the pattern code and the contents linked to the pattern code. For example, the contents linked to the pattern code may include thumbnail of the contents linked to the pattern code, title of the contents linked to the pattern code, etc. For example, as shown in FIG. 8, the mobile device may display the pattern code indicator for identifying the pattern code and the pattern code trigger for storing the information of the pattern, in the image capturing interface. Herein, the pattern code indicator may indicate at least one of a type of the pattern code, a location of the pattern code, and a size of the pattern code.

For example, as shown in FIG. 3, the pattern code trigger may be displayed by being overlaid on the area of the image, where the pattern code is displayed. Also, for example, as shown in FIG. 3, the pattern code trigger may be displayed in the area except for the area where the image is displayed on the display unit.

Next, the mobile device may determine the input signal for the image capturing interface (S1130). In this case, the input signal for the image capturing interface may include a touch input, a gesture input and a voice input for the user.

At the step S1130, when the input signal for the image capturing trigger is detected, the mobile device may store the image (S1140). For example, when the input signal for the image capturing trigger is detected, the mobile device may store the image and the pattern code. In this case, the mobile device may differently set the storage paths of the image and the pattern code. Alternatively, the mobile device may equally set the storage paths of the image and the pattern code.

In the meantime, at the step S1130, when the input signal for the pattern code trigger is detected, the mobile device may store the information of the pattern code (S1150). Also, when the input signal for the pattern code trigger is detected, the mobile device may display the information of the pattern code on the display unit. For example, when the input signal for the pattern code trigger is detected, the mobile device may provide different graphic effects to each of the area of the image, which corresponds to the pattern code, and the area of the image, which does not correspond to the pattern code.

In the meantime, when the image of the pattern code is stored, the mobile device may display the additional trigger in the image of the stored pattern code. In this case, when the input signal for the additional trigger is detected, the mobile device may display the contents linked to the pattern code.

Figure 12:
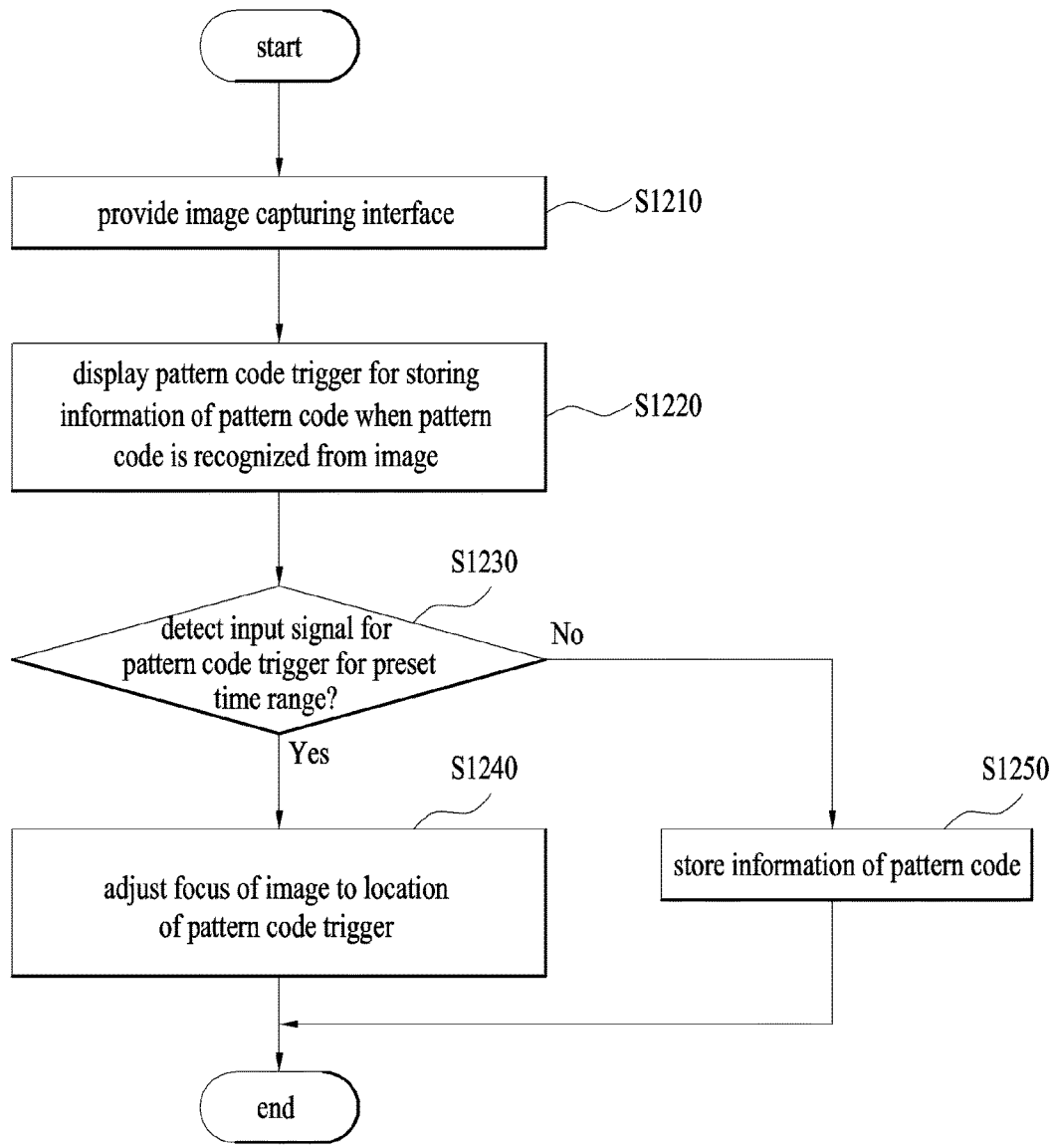
FIG. 12 is a flow chart illustrating another method for controlling a mobile device of the present invention.

FIG. 12 is a flow chart illustrating another method for controlling a mobile device of the present invention. Hereinafter, each step of FIG. 12, which will be described later, may be controlled by the processor 140 of the mobile device 100 shown in FIG. 1. Also, in the embodiment of FIG. 12, detailed description of the same or like parts as those of the embodiment of FIG. 11 will be omitted.

First of all, the mobile device may provide the image capturing interface (S1210). In this case, the image capturing interface may display the image sensed by the camera unit and the image capturing trigger for storing the image.

Next, the mobile device may simultaneously display the pattern code trigger for storing the information of the pattern code, in the image capturing interface only when the pattern code is recognized from the image (S1220). In this case, the information of the pattern code may include at least one of the image of the pattern code and the contents linked to the pattern code.

Next, the mobile device may determine whether the input signal for the pattern code trigger has been detected for the preset time range (S1230). In this case, the pattern code trigger may be used to adjust the image of the image as described in FIG. 4. Also, as shown in FIG. 4, when the input signal for the pattern code trigger is detected, the mobile device may display the time indicator indicating the preset time range.

At the step S1230, when the input signal for the pattern code trigger is detected for the preset time range, the mobile device may adjust the focus of the image to the area corresponding to the location of the pattern code trigger (S1240). Also, when the input signal for the image capturing trigger is detected after the focus of the image is adjusted to the area corresponding to the location of the pattern code trigger, the mobile device may store the image by adjusting the focus of the image to the area corresponding to the location of the pattern code trigger. Also, when the input signal for the pattern code trigger is detected within the preset time range, the mobile device may display the time for enabling focus adjustment through the time indicator.

In the meantime, at the step S1230, when the input signal for the pattern code trigger is not detected for the preset time range, the mobile device may store the information of the pattern code (S1250). In more detail, when the input signal for the pattern code trigger is detected for more than the preset time range, the mobile device may store the information of the pattern code.

Hereinafter, an embodiment of an image capturing interface for automatically adjusting focus of an image depending on whether a pattern code is recognized from an image within a field of view (FOV) area will be described with reference to FIGS. 13 and 14.

Figure 13:
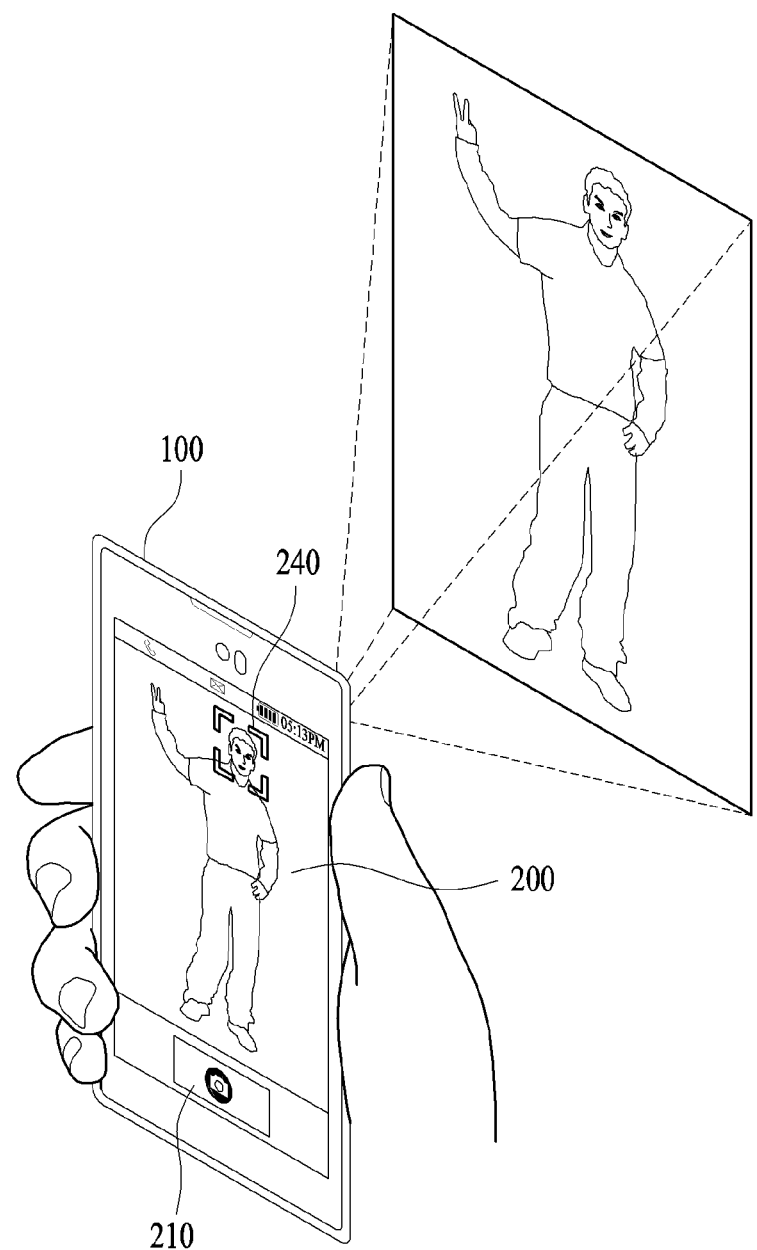
FIG. 13 is a diagram showing another embodiment of an image capturing interface of the disclosure.

FIG. 13 is a diagram showing another embodiment of an image capturing interface of the disclosure. More specifically, FIG. 13 shows the case of adjusting focus of an image and storing the image when a pattern code is not recognized in an image capturing interface 200.

First, as described above with reference to FIG. 3, the mobile device 100 may execute the image capturing interface 200. Here, the image capturing interface 200 may display an image sensed by a camera unit and an image capturing trigger 210 for storing the image. In the embodiment of FIG. 13, the mobile device 100 may sense an image of a person who poses within an FOV area.

Next, the mobile device 100 may determine whether a pattern code is recognized from the image within the FOV area. In the embodiment of FIG. 13, since the pattern code is not recognized from the image within the FOV area, the mobile device 100 does not display a pattern code trigger in addition to the image capturing trigger 210.

The mobile device 100 may automatically adjust the focus of the image to a predetermined area when the pattern code is not recognized from the image within the FOV area. In one embodiment, the predetermined area may correspond to a person's face. In the embodiment of FIG. 13, when a person is included in the image within the FOV area, the mobile device 100 may recognize the person's face and automatically adjust the focus of the image to the user's face. Accordingly, the mobile device 100 may display a focus indicator 240 on the person's face included in the image. In another embodiment, the predetermined area may correspond to a specific object determined by calculating a distance from an object sensed within the FOV area. That is, the mobile device 100 may automatically adjust the focus of the image to the specific object by calculating the distance from the object located within the FOV area. In addition, the mobile device 100 may adjust the focus of the image within the FOV area using various methods.

When an input signal for an area other than a focal area is detected in a state of automatically adjusting the focus of the image, the mobile device 100 may readjust the focus of the image to the area other than the focal area. Here, the focal area may correspond to the area, to which the focus of the image is automatically adjusted in the image capturing interface 200. For example, in the embodiment of FIG. 13, although the focus indicator 240 is located on the person's face, when an input signal for a person's hand is detected, the mobile device 100 may adjust the focus of the image to the person's hand. For example, the detected input signal may correspond to short touch input.

Next, the mobile device 100 may capture and store the image within the FOV area when an input signal for the image capturing trigger 210 is detected. In the embodiment of FIG. 13, the mobile device 100 may capture and store the image in a state of adjusting the focus of the image to the person's face.

Figure 14:
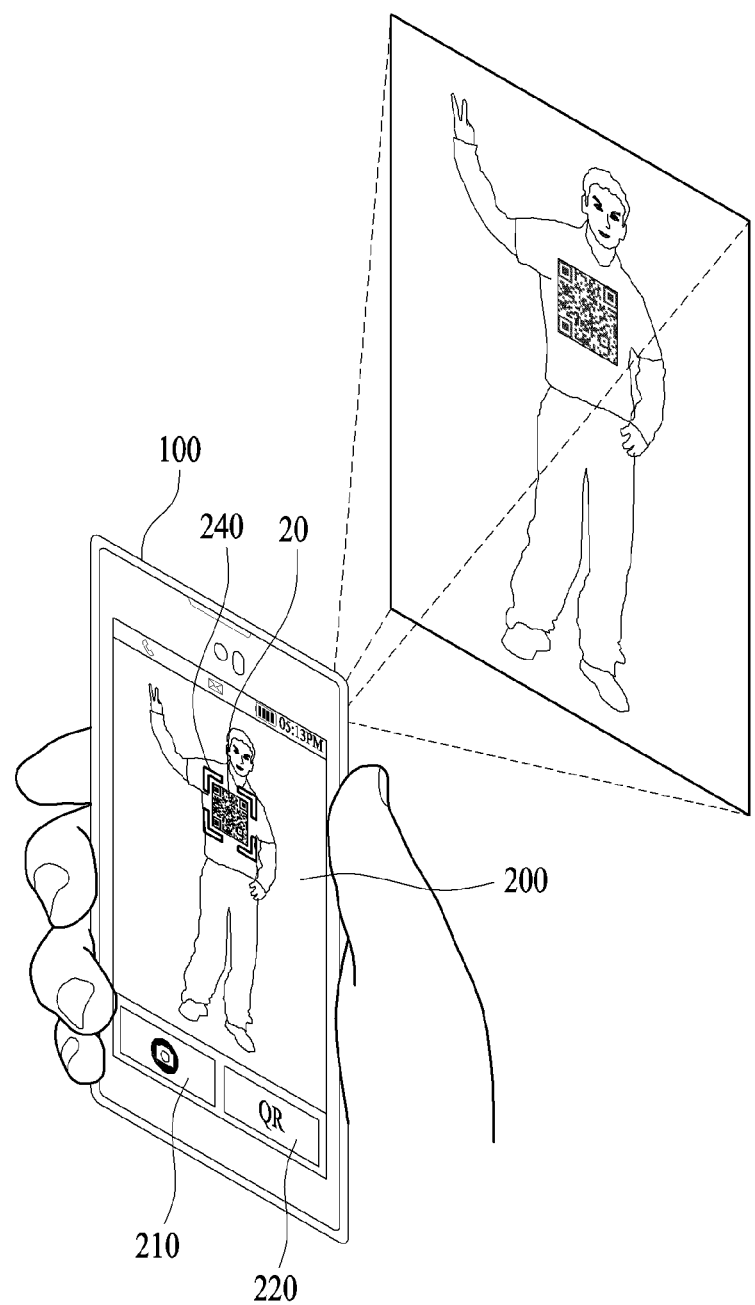
FIG. 14 is a diagram showing another embodiment of an image capturing interface of the disclosure.

FIG. 14 is a diagram showing another embodiment of an image capturing interface of the disclosure. More specifically, FIG. 14 shows the case of adjusting focus of an image and storing the image if a pattern code is recognized in the image capturing interface 200.

First, as described above with reference to FIG. 13, the mobile device 100 may execute the image capturing interface 200. Here, the image capturing interface 200 may display an image sensed by the camera unit and an image capturing trigger 210 for storing the image.

Next, the mobile device 100 may determine whether a pattern code is recognized from the image within the FOV area. In the embodiment of FIG. 14, the mobile device 100 may recognize a pattern code 20 of a T-shirt from the image within the FOV area. In this case, the mobile device 100 may automatically adjust the focus of the image to the area corresponding to the pattern code 20.

In addition, the mobile device 100 may adjust the focus of the image to the area corresponding to the pattern code 20 automatically and simultaneously display a pattern code trigger 220 in the image capturing interface 200. In one embodiment, as shown in FIG. 14, the pattern code trigger 220 may be displayed in parallel with the image capturing trigger 210. In another embodiment, the pattern code trigger 220 may be displayed in the area corresponding to the pattern code and the image capturing trigger 210 may be displayed as a separate icon.

At this time, the mobile device 100 may automatically adjust the focus of the image to the area corresponding to the pattern code 20 when the size of the pattern code of the sensed image exceeds a predetermined size. This is because, when the size of the pattern code of the sensed image is less than the predetermined size, it is difficult for the mobile device 100 to recognize the pattern code. Accordingly, when the size of the pattern code is less than the predetermined size, the mobile device 100 may automatically adjust the focus of the image to a predetermined area except for the pattern code.

Although the focus of the image is automatically adjusted to the area corresponding to the pattern code 20, when an input signal for an area other than the pattern code 20 is detected, the mobile device 100 may readjust the focus of the image to the area other than the pattern code. Here, the input signal for the area other than the pattern code 20 may correspond to short touch input.

Next, as described above with respect to FIG. 13, the mobile device 100 may store the image within the FOV area when the input signal for the image capturing trigger 210 is detected. In addition, the mobile device 200 may display content linked to the pattern code 20 when an input signal for the pattern code trigger 220 is detected. For example, content linked to the pattern code 20 may correspond to an Internet homepage.

Through the embodiments of FIGS. 13 and 14, the mobile device 100 may variously set the focus of the image depending on whether the pattern code is recognized from the sensed image. In addition, even when the user does not separately adjust the focus of the sensed image, it is possible to easily set the focus of the image by an automatic focusing function of the mobile device.

FIG. 15 is a flowchart illustrating a method for controlling a mobile device of the disclosure.

First, the mobile device may provide an image capturing interface (S1510). The image capturing interface may display an image sensed by the camera unit and an image capturing trigger for storing the image.

Next, when a pattern code is recognized from the image, the mobile device may adjust the focus of the image to the area corresponding to the location of the pattern code automatically and simultaneously display the pattern code trigger (S1520). As described above with reference to FIG. 13, the mobile device may automatically adjust the focus of the image to the predetermined area when the pattern code is not recognized from the image. As described above with respect to FIG. 14, when the input signal for the area other than the pattern code is detected, the mobile device may adjust the focus of the image to the area other than the pattern code.

Next, the mobile device may detect the input signal for the image capturing trigger or the pattern code trigger (S1530). For example, as described above with reference to FIG. 14, the image capturing trigger and the pattern code trigger may be displayed in parallel. For example, the image capturing trigger may be displayed as a separate icon and the pattern code trigger may be displayed in the area corresponding to the pattern code.

In step S1530, when the input signal for the image capturing trigger is detected, the mobile device may store the image (S1540). In step S1530, when the input signal for the pattern code trigger is detected, the mobile device may display content linked to the pattern code (S1550).

Although the description may be made for each of the drawings for convenience of description, the embodiments of the respective drawings may be incorporated to achieve a new embodiment. A computer readable recording medium where a program for implementing the embodiments is recorded may be designed in accordance with the need of the person skilled in the art within the scope of the present disclosure.

Also, the device and the method for controlling the same are not limited to the aforementioned embodiments, and all or some of the aforementioned embodiments may selectively be configured in combination so that various modifications may be made in the aforementioned embodiments.

In the meantime, the mobile device and the method for controlling the same according to the present disclosure may be implemented in a recording medium, which can be read by a processor provided in a network device, as a code that can be read by the processor. The recording medium that can be read by the processor includes all kinds of recording media in which data that can be read by the processor are stored. Examples of the recording medium include a ROM, a RAM, a CD-ROM, a magnetic tape, a floppy disk, and an optical data memory. Also, another example of the recording medium may be implemented in a type of carrier wave such as transmission through Internet. Also, the recording medium that can be read by the processor may be distributed in a computer system connected thereto through the network, whereby codes that can be read by the processor may be stored and implemented in a distributive mode.

It will be apparent to those skilled in the art that the present disclosure can be embodied in other specific forms without departing from the spirit and essential characteristics of the disclosure. Thus, the above embodiments are to be considered in all respects as illustrative and not restrictive. The scope of the disclosure should be determined by reasonable interpretation of the appended claims and all change which comes within the equivalent scope of the disclosure are included in the scope of the disclosure.

Also, in this disclosure, both the product invention and the method invention have been described, and description of both inventions may be made complementary if necessary.

What is claimed is:

1. A mobile device comprising:
    a camera unit configured to sense an image;
    a display unit configured to display the image;
    a sensor unit configured to detect an input signal and transmit the detected input signal to a processor;
    a storage unit; and
    the processor configured to control the display unit, the camera unit, the sensor unit, and the storage unit,
    wherein the processor is further configured to:
    provide an image capturing interface displaying the image sensed by the camera unit,
    in response to recognition of a pattern code in the sensed image, automatically adjust a focus of the image to an area corresponding to a location of the pattern code and display a pattern code indicator in the image capturing interface, the pattern code indicator indicating the location and a size of the pattern code in the image,
    in response to detection of an input signal for an image capturing trigger displayed in the image capturing interface, store the image in the storage unit,
    display a gallery interface, wherein the gallery interface displays a thumbnail image corresponding the stored image,
    in response to detection of an input signal for the thumbnail image, enlarge the thumbnail image,
    in response to recognition of the pattern code included in the enlarged thumbnail image, automatically display a first pattern code trigger, and
    in response to detection of an input signal for the first pattern code trigger, display content linked to the pattern code.

2. The mobile device according to claim 1, wherein the pattern code indicator is displayed in the area corresponding to the location of the pattern code.

3. The mobile device according to claim 1, wherein the processor is further configured to adjust the focus of the image to a predetermined area of the sensed image when the pattern code is not recognized from the image.

4. The mobile device of claim 3, wherein the predetermined area of the sensed image corresponds to a person's face.

5. The mobile device according to claim 1, wherein, when the pattern code is recognized from the image and a size of the pattern code in the image exceeds a predetermined size, the processor is further configured to adjust the focus of the image to an area corresponding to the location of the pattern code automatically.

6. The mobile device according to claim 1, wherein the processor is further configured to display a time indicator indicating how long the user input for the first pattern code trigger is maintained.

7. The mobile device according to claim 1, wherein the pattern code indicator further indicates a type of the pattern code.

8. The mobile device according to claim 1, wherein the processor is further configured to further store an image of the pattern code in the storage unit in response to the detection of the input signal for the image capturing trigger.

9. The mobile device according to claim 8, wherein storage paths of the image and the image of the pattern code are differently set.

10. The mobile device of claim 1, wherein the input signal includes at least one of a touch input, a voice input and a gesture input.

11. The mobile device of claim 1, wherein the pattern code includes a bar code and a quick response (QR) code.

12. The mobile device of claim 1, wherein an appearance of the pattern code trigger is changed according to a type of the pattern code.

13. The mobile device of claim 1, wherein the processor is further configured to:
   in response to recognition of the pattern code in the sensed image, automatically display a second pattern code trigger together with the image capturing trigger in the image capturing interface.

14. A method for controlling a mobile device sensing an image including a pattern code, the method comprising:
   providing an image capturing interface via a display unit of the mobile device, the image capturing interface displaying the image sensed by a camera;
   in response to recognition of a pattern code in the sensed image, automatically adjusting a focus of the image to an area corresponding to a location of the pattern code and displaying a pattern code indicator in the image capturing interface, the pattern code indicator indicating the location and a size of the pattern code in the image;
   in response to detection of an input signal for an image capturing trigger displayed in the image capturing interface, storing the image in a storage unit of the mobile device;
   displaying a gallery interface, wherein the gallery interface displays a thumbnail image corresponding the stored image;
   in response to detection of an input signal for the thumbnail image, enlarging the thumbnail image;
   in response to recognition of the pattern code included in the enlarged thumbnail image, automatically displaying a pattern code trigger; and
   in response to detection of an input signal for the pattern code trigger, displaying content linked to the pattern code.

* * * * *